United States Patent
Edwards et al.

(10) Patent No.: US 11,227,289 B2
(45) Date of Patent: Jan. 18, 2022

(54) SYSTEMS AND METHODS FOR USER AUTHENTICATION USING CARD-SWIPE SEQUENCE

(71) Applicant: Capital One Services, LLC, McLean, VA (US)

(72) Inventors: Joshua Edwards, Philadelphia, PA (US); Abdelkader M'hamed Benkreira, New York, NY (US); Michael Mossoba, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/849,265

(22) Filed: Apr. 15, 2020

(65) Prior Publication Data
US 2021/0326891 A1 Oct. 21, 2021

(51) Int. Cl.
*G06Q 20/40* (2012.01)
*G06Q 20/34* (2012.01)

(52) U.S. Cl.
CPC ....... *G06Q 20/4093* (2013.01); *G06Q 20/356* (2013.01); *G06Q 20/4018* (2013.01)

(58) Field of Classification Search
CPC ... G06Q 20/346; G06Q 20/401; G06Q 20/409
See application file for complete search history.

(56) References Cited

U.S. PATENT DOCUMENTS

| 5,979,773 | A | * | 11/1999 | Findley, Jr. | G07F 7/02 235/492 |
| 6,298,441 | B1 | * | 10/2001 | Handelman | G06Q 20/346 713/185 |
| 8,191,782 | B2 | | 6/2012 | Blythe | |
| 8,365,986 | B2 | * | 2/2013 | Perry, Sr. | G06Q 20/346 235/380 |
| 9,183,480 | B1 | * | 11/2015 | Quigley | G06Q 20/385 |
| 9,208,493 | B2 | * | 12/2015 | Perry, Sr. | G06Q 20/4014 |
| 2007/0215698 | A1 | * | 9/2007 | Perry | G07F 7/1008 235/380 |
| 2009/0078761 | A1 | | 3/2009 | Sines | |
| 2012/0254031 | A1 | * | 10/2012 | Walker | G06Q 40/02 705/42 |

(Continued)

*Primary Examiner* — Christle I Marshall
(74) *Attorney, Agent, or Firm* — Finnegan, Henderson, Farabow, Garrett & Dunner LLP

(57) ABSTRACT

Systems and methods for user authentication using an authentication sequence are disclosed. The disclosed systems and methods may include a computing device for authenticating a user. The computing device may include at least one processor and at least one computer-readable medium. The at least one computer-readable medium can containing instructions that, when executed by the at least one processor, cause the computing device to perform operations. The operations may include receiving an authentication sequence provided by one or more authentication objects and authenticating the user based on the authentication sequence. The authentication sequence can be a card-swipe sequence and authentication can be performed based on characteristics of the card-swipe sequence, such as the cards used, the order the cards are used in the sequence, the timing of card use, and the type of card swipe.

20 Claims, 6 Drawing Sheets

(56) References Cited

U.S. PATENT DOCUMENTS

| | | | |
|---|---|---|---|
| 2013/0204722 A1* | 8/2013 | Perry, Sr. | G06Q 20/4014 705/17 |
| 2014/0146667 A1* | 5/2014 | Zhang | H04W 28/0268 370/230 |
| 2017/0262845 A1 | 9/2017 | Eisen | |

* cited by examiner

SYSTEMS AND METHODS FOR USER AUTHENTICATION USING CARD-SWIPE SEQUENCE

BACKGROUND

Transactions may require authentication to prevent malicious actors from accessing a user's account. But malicious actors may attempt to steal authentication information during a transaction. If successful, the malicious actor may use such authentication information to access the user's account.

For example, automated teller machines ("ATMs") generally require a user to be authenticated before granting access to a financial account. Some conventional systems of user of authentication require a single swipe of a card associated with the user's financial account and entry of a personal identification number ("PIN"). The card information provided by the card swipe and the PIN number present a security risk. Malicious actors can use skimmers and cameras to acquire this authentication information during a transaction.

A skimmer or camera may be placed on an ATM such that when a customer swipes his or her card and enters a PIN, the malicious actor will obtain the user's card information and PIN. A skimmer may be placed over the ATM's card scanner such that the ATM and the skimmer both scan the user's card. Thus, the user may gain access to her account and complete a transaction, without knowing that her personal information has been comprised. The skimmer may include a camera that is positioned to view the ATM's PIN entry area to capture the use's PIN number when entered. Once a malicious actor has a user's card information and PIN, the malicious actor can use the data to access the user's account. Unfortunately, such skimmers and cameras may be difficult for an untrained user to detect.

Malicious actors can use skimmers and cameras in many different situations to acquire authentication information during a transaction, not just ATM transactions. For example, skimmers and cameras may be used at point of sale terminals or other automated kiosks.

Some current approaches attempt to prevent malicious actors from capturing a user's PIN. But such methods still require entry of the PIN. Some approaches use longer or more complicated pin numbers, which may be more difficult for malicious actors to completely capture. But using a longer or more complicated PIN places a greater burden on the user to remember and accurately provide the PIN each time the user wishes to be authenticated.

SUMMARY

The disclosed embodiments describe systems and methods for user authentication using a card-swipe sequence. For example, in an exemplary embodiment, there may be a computing device for authenticating a user. The computing device may comprise at least one processor; and at least one computer-readable media containing instructions that, when executed by the at least one processor, cause the computing device to perform operations. The operations may comprise receiving a sequence of card swipes, the receiving comprising: detecting a swipe of a first card, storing first card information associated with the first card; detecting a swipe of a second card, storing second card information associated with the second card; and authenticating a user based on the sequence of card swipes.

According to a disclosed embodiment, authenticating the user may comprise transmitting the first and second card information to an authentication server.

According to a disclosed embodiment, authenticating the user may comprise transmitting the first card information and a hash of the second card information to an authentication server.

According to a disclosed embodiment, the operations may further comprise receiving a user input indicating completion of the sequence of card swipes.

According to a disclosed embodiment, the second card may be inactive

According to a disclosed embodiment, the first card may be associated with a first financial account and the operations may further comprise granting the user access to the first financial account.

According to a disclosed embodiment, the first card and second card may not be associated a first financial account and the operations may further comprise granting the user access to the first financial account.

According to a disclosed embodiment, the sequence of card swipes may comprise a combination of three or more swipes of at least one of the first card or the second card.

According to a disclosed embodiment, receiving a sequence of card swipes may further comprise detecting one or more swipes of one or more additional cards.

According to another disclosed embodiment, there may be another computing device for authenticating a user. The computing device may comprise at least one processor; and at least one computer-readable media containing instructions that, when executed by the at least one processor, may cause the computing device to perform operations. The operations may comprise receiving a sequence of card swipes, the receiving the sequence of card swipes comprising: detecting a swipe of a first card, storing first card information associated with the first card; detecting a swipe of a second card, storing second card information associated with the second card, tracking an amount of elapsed time between the first and second card swipes, and determining that the amount of elapsed time falls within a predetermined time range; and authenticating a user based on the sequence of card swipes and the determination that the amount of elapsed time falls within the predetermined time range.

According to a disclosed embodiment, the operations may further comprise providing a visual indication of the elapsed time to the user.

According to a disclosed embodiment, the visual indication of the elapsed time indication may be a timer displayed on a screen of the computing device.

According to a disclosed embodiment, the visual indication of the elapsed time may be a repeating flash of light.

According to a disclosed embodiment, the operations may further comprise receiving a user input indicating completion of the sequence of card swipes.

According to a disclosed embodiment, authenticating the user may comprise transmitting the first and second card information to an authentication server.

According to a disclosed embodiment, authenticating the user may comprise transmitting the first card information and a hash of the second card information to an authentication server.

According to a disclosed embodiment, the first card may be associated with a financial account and the operations may further comprise granting the user access to the financial account.

According to a disclosed embodiment, the first card and the second card may not be associated with a first financial account and the operations may further comprise granting the user access to the first financial account.

According to another disclosed embodiment, a method may be implemented for enrolling a user in an authentication system. The method may comprise receiving, using a first device, user identification information, the user identification information comprising a user identifier or an account identifier associated with a user account; receiving, using the first device, first card information, the first card information being associated with a first card and comprising a card number and a card expiration; receiving, using the first device, second card information, the second card information being associated with a second card and comprising a card number and a card expiration; receiving, using the first device, a card identification sequence, the receiving comprising identifying an order in which one or more swipes of the first card and one or more swipes of the second card must occur for a user to be authenticated; determining that the card identification sequence meets a security standard; storing, based on the determination, the user identification information, first card information, second card information, and card identification sequence; and authenticating, using a second device and based on the card identification sequence, a user.

According to a disclosed embodiment, the first device may be remote from the second device.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate several embodiments and, together with the description, serve to explain the principles of the disclosure. The drawings are not necessarily to scale or exhaustive. In the drawings.

DETAILED DESCRIPTION

Figure 1:
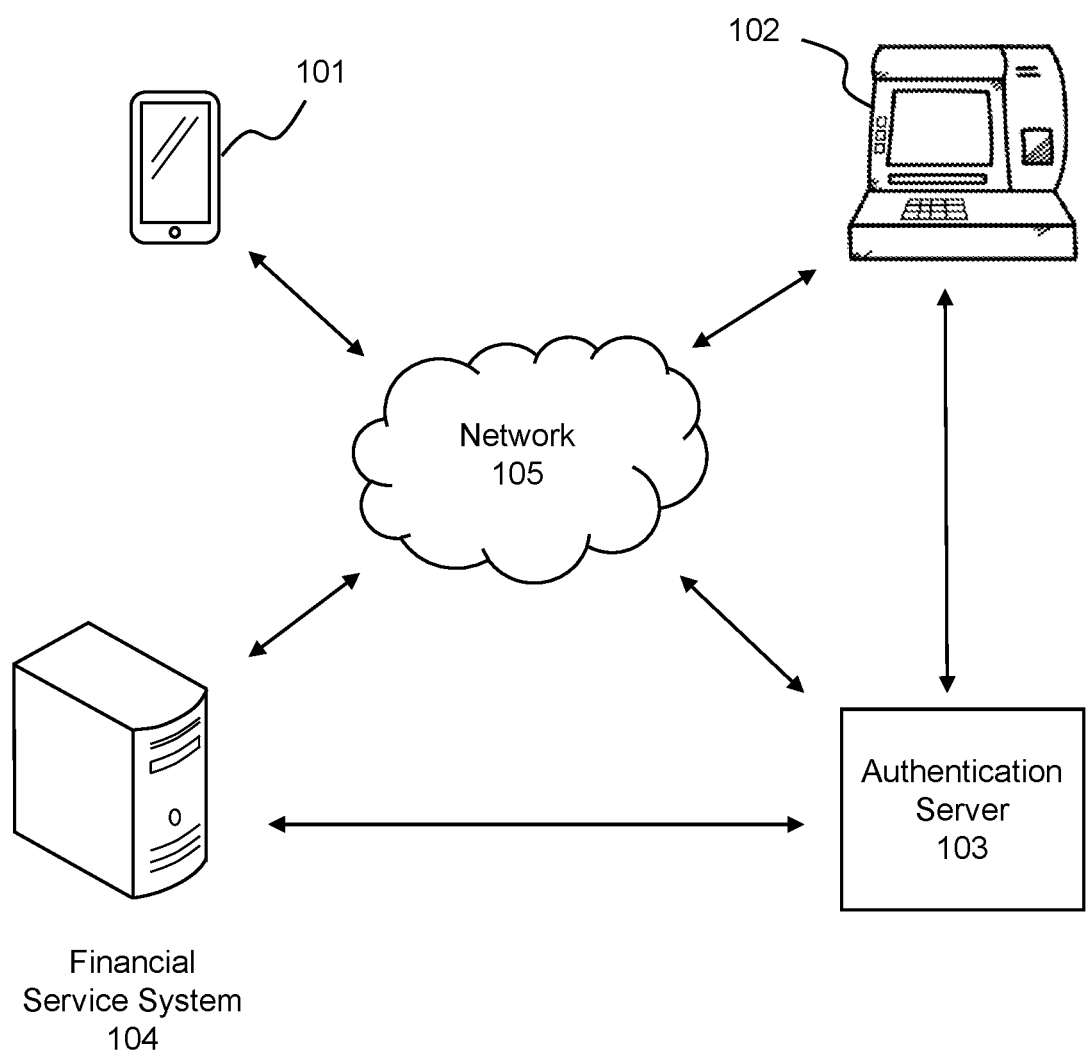
FIG. 1 is a block diagram of an exemplary system for authenticating a user using a card-swipe sequence in accordance with disclosed embodiments.

Reference will now be made in detail to exemplary embodiments, discussed with regards to the accompanying drawings. In some instances, the same reference numbers will be used throughout the drawings and the following description to refer to the same or like parts. Numerous specific details are set forth in order to provide a thorough understanding of the disclosed example embodiments. Unless otherwise defined, technical and/or scientific terms have the meaning commonly understood by one of ordinary skill in the art. The disclosed embodiments are described in sufficient detail to enable those skilled in the art to practice the disclosed embodiments.

However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently. For example, unless otherwise indicated, method steps disclosed in the figures can be rearranged, combined, or divided without departing from the envisioned embodiments. Similarly, additional steps may be added or steps may be removed without departing from the envisioned embodiments. For example, according to some embodiments, parts of processes 300, 400, 500, and 600 in the following description may be combined (e.g., one or more steps from process 500 may be added to process 400).

Malicious actors can compromise authentication systems that combine presenting an authentication object (e.g., swiping a magnetic card or moving an RFID card into the proximity of a card reader) and entering a password (e.g., a PIN number, or the like). For example, malicious actors can use skimmers and cameras, or similar devices, to obtain authentication information from the authentication object and record entry of the password. The malicious actors can then authenticate themselves using the illicitly obtained authentication information and password.

The disclosed embodiments can enable authentication without entry of a password, defeating techniques that use skimmers and cameras, or the like, to illicitly obtain authentication information. Furthermore, disclosed embodiments may enable user authentication using existing authentication objects (e.g., magnetic cards, RFID cards, or the like). Accordingly, in some embodiments, users need not carry or present new authentication objects. Users may therefore benefit from the additional security provided by the disclosed embodiments without the inconvenience of having to change or adapt their behavior.

The disclosed embodiments can include presenting one or more authentication objects multiple times in a sequence to authenticate a user. Characteristics of the sequence, such as the timing of presentation, authentication objects presented, order of presentation, manner or orientation of presentation, or the like, can be used in addition to, or in place of, a password. For example, a user may be authenticated based on a personalized sequence of card swipes. As used herein, a swipe may include, for example, at least one of a swipe of a card through a magnetic stripe reader, inserting a card into a chip reader, transfer of data through a contactless method, etc. In some embodiments, the sequence may incorporate a variety of cards and may vary in timing between swipes so as to impede any attempts by a malicious actor to steal the user's authentication information. In some embodiments, card swipes may vary in type so as to further impede malicious access attempts.

The disclosed embodiments may prevent traditional skimmers and cameras from gaining enough information to access a user's account. As the user need not enter a password, the cameras may not provide useful information for the malicious actor. Additionally, traditional skimmers may not record timing, presentation order, type of presentation, or other characteristics of an authentication sequence. Furthermore, when a sequence includes multiple cards, a malicious actor may need to produce multiple functioning counterfeit cards in order to use the sequence to access a user's account. These challenges may increase the difficulty and complexity of defeating the disclosed authentication systems and methods using traditional skimmers and cameras.

The disclosed embodiments can include an enrollment phase, in which an authentication sequence is associated with at least one of a user or account. The enrollment phase can be performed using a personal computing device, a terminal, a designated kiosk at a bank branch, etc. As described in greater detail below with respect to FIG. 6, during the enrollment phase a user may specify an authentication sequence (e.g., by entering or performing a sequence of card swipes to be used in a card-swipe authentication process). The disclosed embodiments can include an authentication phase, in which the user performs the authentication sequence to access an account. As described in greater detail below with respect to FIGS. 3 to 5, the card-swipe authentication process may be used to authenticate a user using swipes of one or more cards. In some cases, the card-swipe authentication process could be used alone for authentication or used in conjunction with other authentication methods (e.g., entering a PIN number) for additional security.

Reference will now be made in detail to the disclosed embodiments, examples of which are illustrated in the accompanying drawings.

FIG. 1 depicts a block diagram of an exemplary system 100 for authenticating a user using a card-swipe sequence in accordance with disclosed embodiments. System 100 can include a user device 101, a terminal 102, an authentication server 103, and a financial service system 104, as shown in FIG. 1. Components of system 100 may be connected via a network 105. In some embodiments, components of system 100 may also communicate directly between each other. As described in greater detail below, terminal 102 can receive card information and a card-swipe sequence from a user. Terminal 102 can then send the card information and sequence to authentication server 103 or financial service system 104 for authentication of the user. If the user is authenticated, the authentication server 103 or financial service system 104 may grant access to the user's account through terminal 102. In further embodiments, also described in greater detail below, user device 101 may be used to enroll a user in the card-swipe authentication system. User device 101 may receive user data that can then be transmitted to authentication server 103 or financial service system 104 for later authentication of the user. Similarly, in some embodiments, the user may be enrolled using terminal 102.

As described in greater detail below with respect to FIG. 2 and FIG. 6, user device 101 can be configured to receive information from a user to enroll the user in the card-swipe authentication system. User device 101 can be a computing device capable of processing and/or receiving data, such as a mobile device (e.g., a wearable device, such as a smart watch, smart jewelry, or the like; a mobile phone; a tablet; a notebook; a digital camera; or the like); a personal computer (e.g., a desktop, laptop, workstation, or the like); a server; a cloud computing environment or a virtual machine (e.g., virtualized computer, container instance, etc.); a special-purpose computing device, such as a computing kiosk or terminal (e.g., a dedicated computer kiosk at a bank branch location for user enrollment); or the like.

In certain embodiments, user device 101 may be a terminal-based (e.g., Unix or Linux) computing device. For example, the user device 101 may provide only a terminal interface for interacting with the system. In some embodiments, by contrast, user device 101 may operate using a visual operating system, such as a Windows™ operating system, Apple™ operating system, Android™ operating system, a cloud-based operating system (e.g., through AWS™, Azure™, IBM Cloud™, etc.), or other types of non-terminal operating systems. Further structure of user device 101 is described below with respect to FIG. 2.

Terminal 102 may be an automated teller machine ("ATM"), point of sale terminal, or other type of computing device or terminal. In some embodiments, terminal 102 may be a personal computing device or mobile device (e.g., a laptop or smartphone) capable of sending and receiving data. In some embodiments, terminal 102 may include hardware or software for sending or receiving data from another computing device, such as wireless transmitters or receivers capable of sending and receiving data through network 105, or directly with other components of system 100. Terminal 102 can include a card receiver, which may be a magnetic stripe reader, near-field communications receiver, RFID receiver, chip reader, etc. The card receiver can be configured to read a credit card, debit card, or similar card associated with a user. As an example, terminal 102 may be a mobile phone with an associated card reader (e.g., a Square™ card reader that connects to the phone).

In some embodiments, terminal 102 may include various input/output devices configured to receive additional information from a user. For example, terminal 102 may include a keyboard, mouse, trackpad, touch-sensitive screen, numerical keypad, or the like. In some embodiments, terminal 102 may also include output devices configured to provide feedback to the user, for example to indicate to the user that input has been received. Feedback may include visual or auditory feedback such as a timer, flashes of lights, certain sounds, etc. The disclosed embodiments are not limited to I/O devices physically connected to user device 101. In some embodiments, computing device 101 can include I/O devices that wirelessly communicate with terminal 102.

Financial service system 104 can be associated with a bank or other financial service. Financial service system 104 can be a computing system or network comprising multiple parts. For example, financial service system may include one or more computing devices, one or more servers, a cloud or virtual computing environment, one or more databases, etc. In some embodiments, financial service system 104 may be a local network, for example, within a physical bank location. In such cases, user device 101, terminal 102, and/or authentication server 103 may communicate directly with financial service system 104, with or without network 105. Financial service system 104 may store data associated with a bank or other financial service provider. For example, financial service system 104 may store financial account information including the account holder, account number, information of any cards associated with the account, authentication information, etc. Consistent with disclosed embodiments, financial service system 104 may store user information and card sequences for users enrolled in the card-swipe authentication system.

System 100 may include one or more authentication servers 103. Authentication server 103 can be a computing device capable of processing and/or receiving data, such as a personal computer (e.g., a desktop, laptop, workstation, or the like); server, a cloud computing environment or a virtual machine (e.g., virtualized computer, container instance, etc.); a special-purpose computing device, such as a specialized server or computer (e.g., a network appliance, or the like); or the like.

Authentication server 103 can be configured to manage the various elements of system 100. In some embodiments, authentication server 103 can be configured to manage enrollment and authentication of users. During an enrollment phase, authentication server 103 may be configured to receive and store authorization information related to users enrolled or not enrolled in the authentication system. In some embodiments, authentication server 103 may manage the user enrollment process described below with respect to FIG. 6. For example, authentication server 103 may be configured to receive authentication information including card information and authentication sequence information from user device 101 or terminal 102. Authentication server 103 may be configured to determine whether the received authentication information is adequate (e.g., is sufficient unique or distinctive to serve as a password). When the authentication information is adequate, authentication server 103 may be configured to store the authentication information for subsequent use in authenticating the user.

Authentication server 103 may be configured to authenticate the user in an authentication phase, consistent with disclosed embodiments. In the authentication phase, authentication server 103 may be configured to receive authentication information from terminal 102. In some embodiments, authentication server 103 may compare the authentication information with the enrollment information to determine whether they match. As described below with respect to FIG. 3, the match may be determined based upon a similarity threshold. The similarity threshold may be predetermined and stored in authentication server 103. In some embodiments, authentication server 103 may be configured to receive the similarity threshold from financial service system 104. In some embodiments, the similarity threshold may be a threshold match score. Authentication server 103 may be configured to generate a match score based on the enrollment and authentication information. The match score may be a quantitative value providing an indication of the level of similarity between the enrollment information and received authentication information. For example, a perfect match score may result if the authentication information entered by a user at a terminal exactly matches the stored enrollment information. As another example, a match score of zero may result if none of the received authentication information matches the stored enrollment information. If the match score exceeds the threshold match score, authentication server 103 may determine that the information matches. If the information matches, authentication sever 103 may authenticate the user attempting to access an account using terminal 102. In some embodiments, authentication server 103 may be configured to send an authentication indication to terminal 102. An authentication indication may indicate to terminal 102 whether the authentication information and enrollment information match and whether the user is authenticated.

Network 105 can facilitate communications between the other components of system 100. Network 105 can include one or more networks, including a TCP/IP network (e.g., the Internet), a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications network (e.g., a Bluetooth link, an infrared link, etc.), or another type of communications network. The disclosed embodiments are not limited to embodiments in which communications between components of system 100 occur over a particular type of network. Furthermore, the disclosed embodiments are not limited to communication through network 105. In some embodiments, components of system 100 may additionally or alternatively communicate between each other directly. Direct communications may occur, for example, through a nearfield communications technique (e.g., Bluetooth, infrared, etc.). While FIG. 1 shows certain arrows illustrating communications between various components, other communications not depicted are possible. For example, in certain embodiments, user device 101 may communicate directly with financial service system 104 or terminal 102. Similarly, all communications depicted are not necessarily required (e.g., terminal 102 may not communicate directly with authentication server 103 in every embodiment; instead, financial service system 104 may handle communications between terminal 102 and authentication server 103 in some embodiments).

Figure 2:
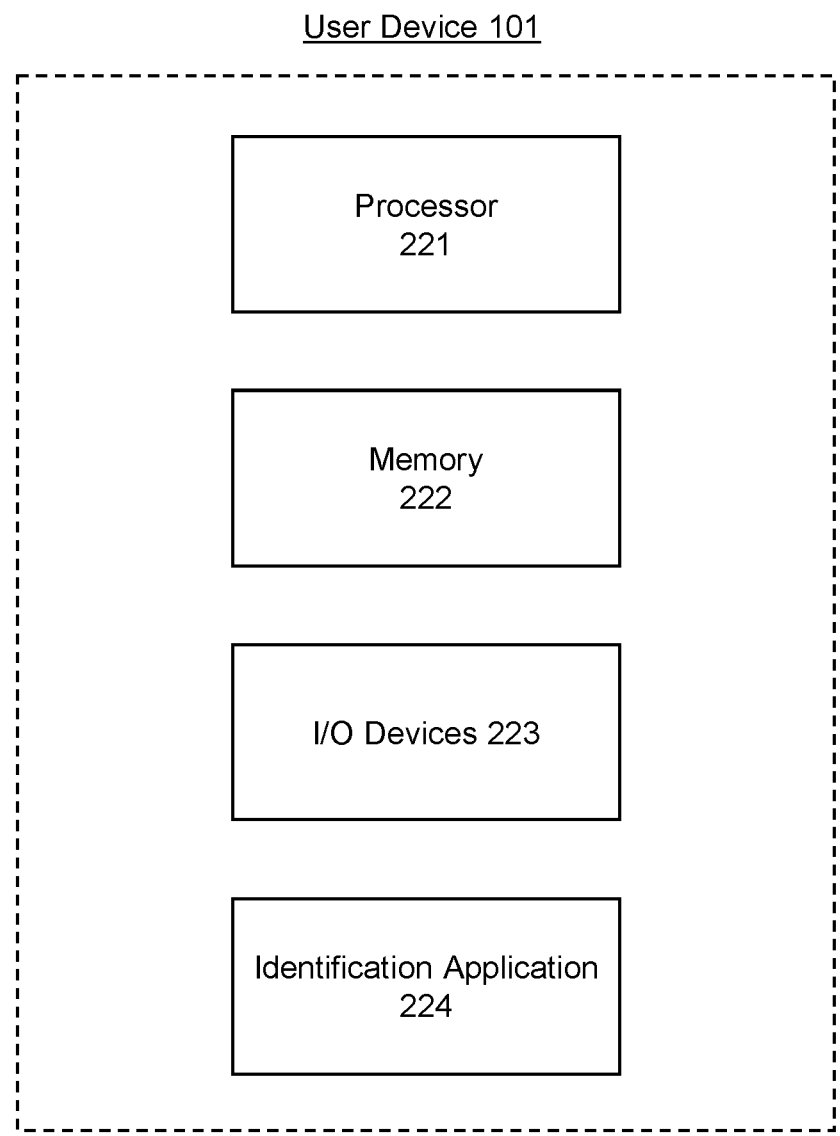
FIG. 2 is a block diagram depicting an exemplary user device in accordance with disclosed embodiments.

FIG. 2 depicts a block diagram of an exemplary user device 101 in accordance with disclosed embodiments. User device 101 may comprise one or more processors 221, one or more memories 222, one or more I/O devices 223, and an identification application 224.

Processor (or processors) 221 can be one or more data or software processing devices. For example, the processor 221 may take the form of, but is not limited to, a microprocessor, embedded processor, or the like, or may be integrated in a system on a chip (SoC). Furthermore, according to some embodiments, the processor 221 may be a processor manufactured by Intel®, AMD®, Qualcomm®, Apple®, NVIDIA®, or the like. Processor 221 may also be based on the ARM architecture, a mobile processor, or a graphics processing unit, etc. The disclosed embodiments are not limited to any type of processor configured in the computing device 101. Additionally, processor 221 may in some embodiments execute one or more programs (or portions thereof) remotely located from the computing device 101.

Memory (or memories) 222 may include one or more storage devices configured to store instructions used by the processor 221 to perform functions related to disclosed embodiments. Memory 222 may be configured to store software instructions, such as programs, that when executed by processor 221, perform one or more operations consistent with disclosed embodiments. The disclosed embodiments are not limited to particular software programs or devices configured to perform dedicated tasks. For example, memory 222 may store a single program, such as a user-level application, or may store multiple software programs. For example, memory 222 may include a program for receiving information from a user to enroll the user in the card-swipe authentication system, e.g., executing process 500 illustrated in FIG. 5. As another non-limiting example, memory 222 may store an internet browser application, which may facilitate access to network 105 by user device 101 to communicate with other components of system 100. Memory 222 may also be configured to store data associated for use by a program or data entered by a user in accordance with disclosed embodiments. In some embodiments, memory 222 may also include an operating system (e.g., a Windows™ operating system, Apple™ operating system, Android™ operating system, Linux operating system, a cloud-based operating system, or other types of operating systems).

I/O device (or devices) 223 can include a device configured to allow user device 101 to send or receive information.

For example, I/O device 223 may comprise hardware or software for sending or receiving data from another computing device, such as wireless transmitters or receivers capable of sending and receiving data through network 105, or exchanging data directly with other components of system 100. In some embodiments, I/O devices 223 can comprise devices for receiving input directly from a user, for example, a keyboard, mouse, trackpad, touch-sensitive screen, or the like. In some embodiments, I/O devices 223 can include hardware to provide information to the user, for example, a display or printer. According to disclosed embodiments, I/O devices 223 can be configured to provide feedback to the user, for example to indicate to the user that input has been received. Feedback may include visual or auditory feedback such as a timer, flashes of lights, certain sounds, etc. In some embodiments, I/O devices 223 can also comprise a card reader. For example, user device 101 may be a mobile phone with an associated card reader (e.g., a Square™ card reader that connects to the phone). The disclosed embodiments are not limited to I/O devices physically connected to user device 101. In some embodiments, user device 101 can include I/O devices 223 that wirelessly communicate with user device 101.

User device 101 may also include an identification application 224. Identification application 224 may be stored in memory 222. In some embodiments, identification application 224 may be stored and executed in the cloud, for example on a virtual machine instance. According to disclosed embodiments, identification application 224 can be a client program configured to enable user device 101 to interact with an identification application running on a remote server or cloud computing platform. Identification application 224 may be configured to provide a graphical user interface (GUI) through which a user can enroll in the card-swipe authentication system. Identification application 224 may also enable enrolled users to change their personal identification information, change their cards or cards swipe sequence, or access their financial account information. In some embodiments, identification application may not be stored on user device 101 but may be accessed by user device 101 (e.g., when identification application 224 is stored in a cloud (virtual) computing environment, online database, etc.). According to other disclosed embodiments, identification application 224 may be part of financial service system 104. For example, identification application 224 may be a website or other web-based application stored on financial service system 104 that may be accessed by a user through user device 101. In some embodiments, identification application 224 may be part of an existing application associated with financial service system 104.

Figure 3:
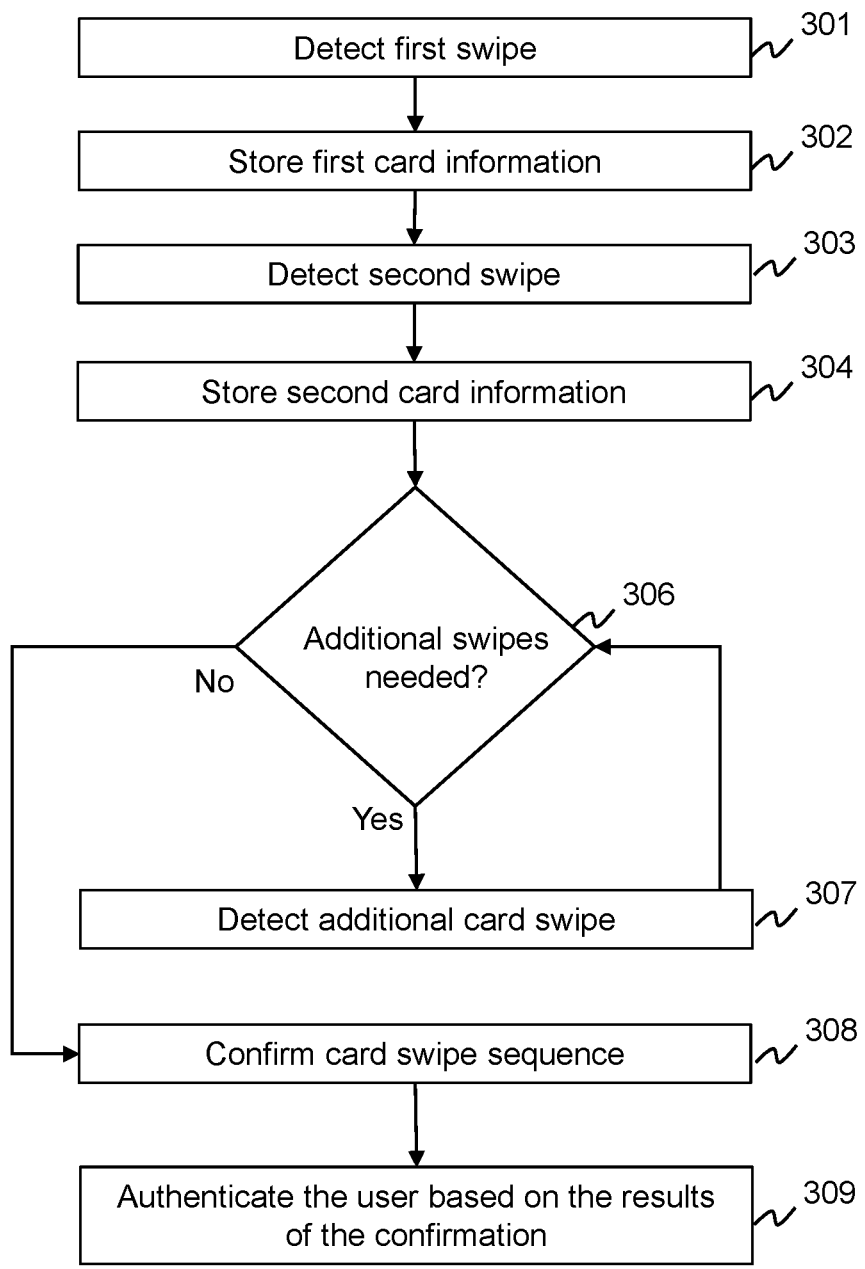
FIG. 3 is a flowchart depicting an exemplary process for authenticating a user using a card-swipe sequence.
Figure 4:
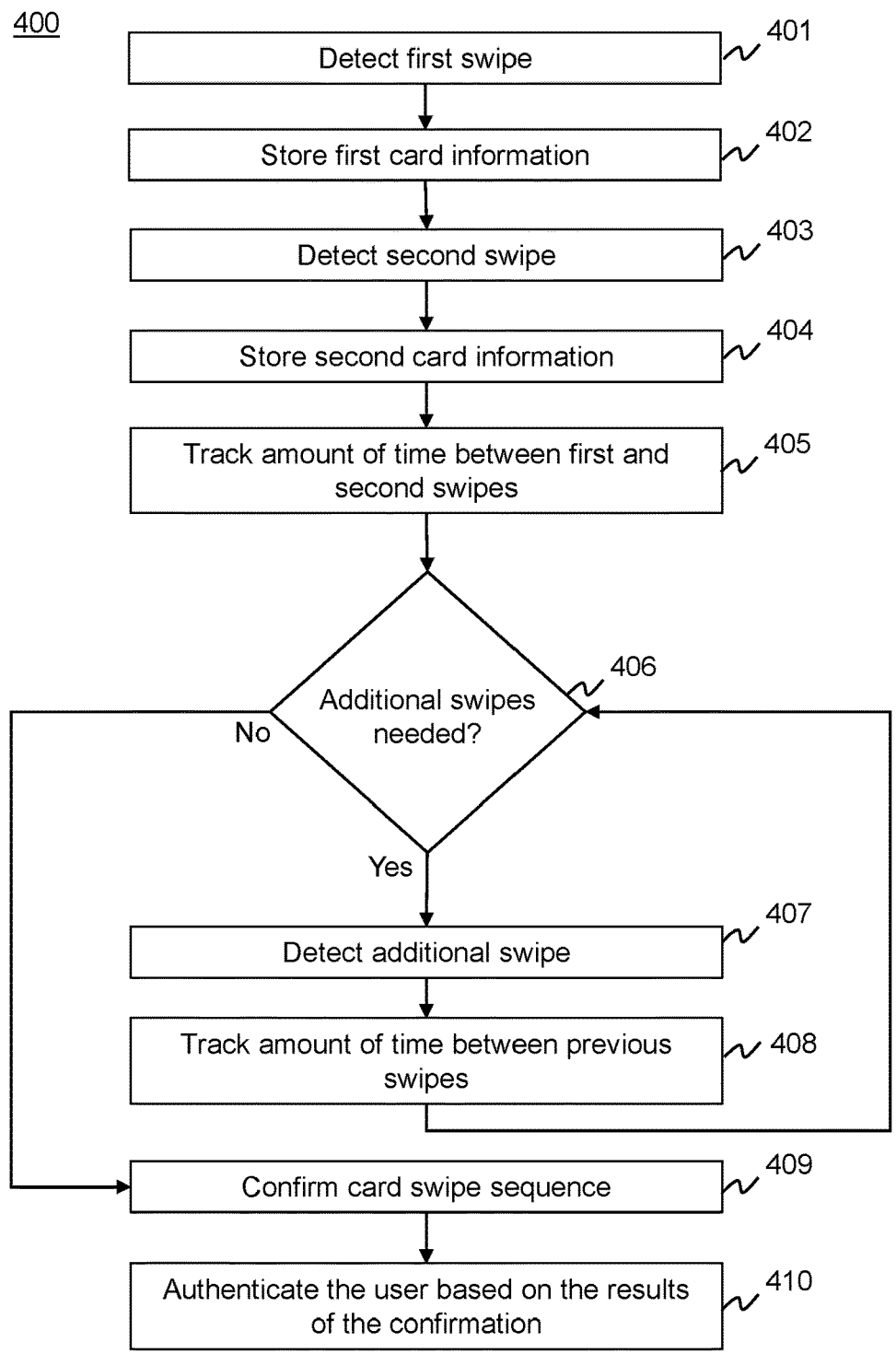
FIG. 4 is a flowchart depicting another exemplary process for authenticating a user using a card-swipe sequence.
Figure 5:
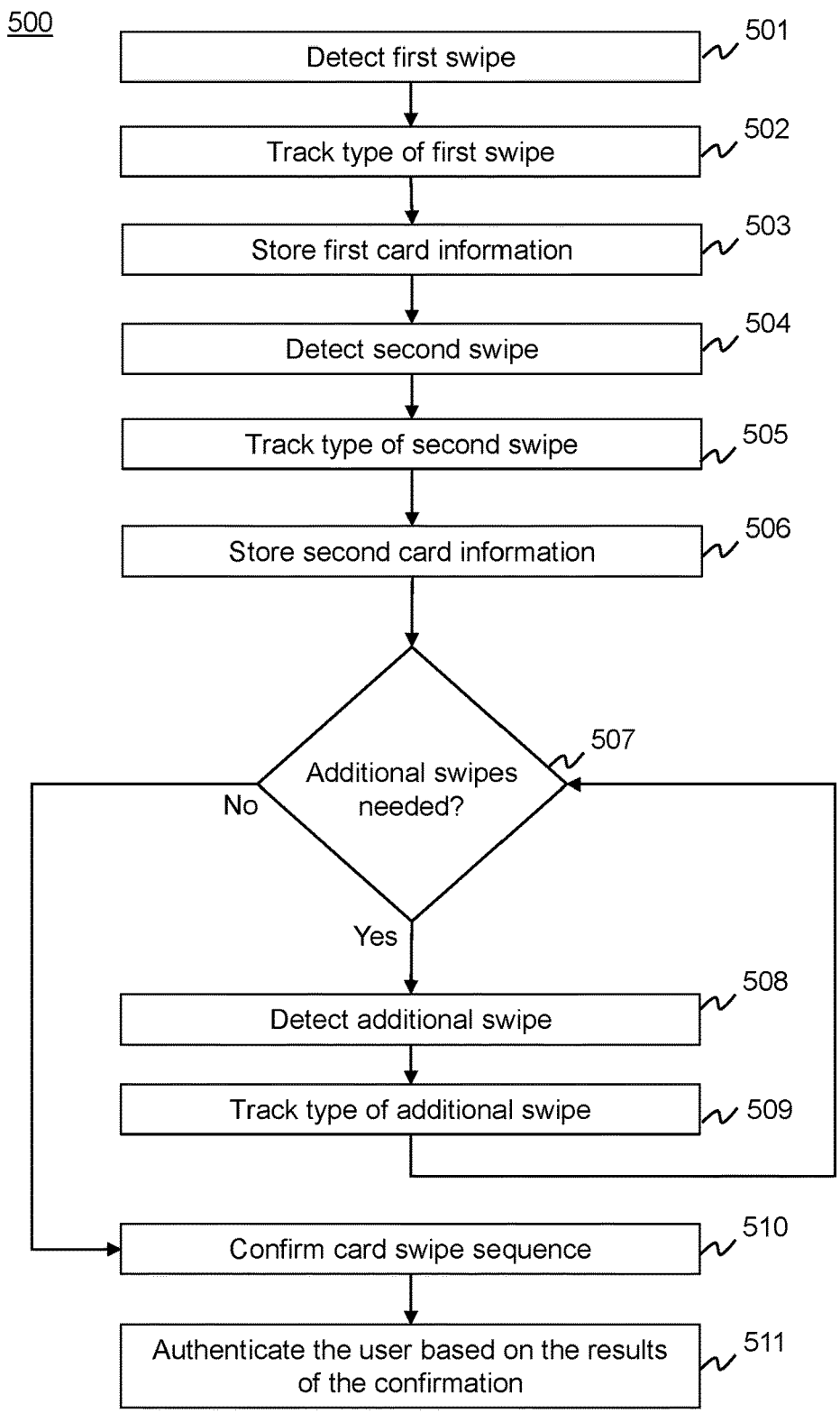
FIG. 5 is a flowchart depicting a further exemplary process for authenticating a user using a card-swipe sequence.

For ease of explanation, FIGS. 3 to 5 are described with regard to terminal 102 and authentication server 103. However, in some embodiments, user device 101 can be used wholly or partially in place of terminal 102. For example, user device 101 can be configured with an I/O device for receiving card swipes and can communicate with authentication server 103 to authenticate a user, in place of terminal 102. Likewise, in some embodiments, financial services system 104 can be used wholly or partially in place of authentication server 103. For example, financial services system 104 may be configured to confirm an authentication sequence of card swipes and authenticate a user.

FIG. 3 is a flowchart depicting an exemplary process 300 for authenticating a user using an authentication sequence. The authentication sequence can include providing multiple authentication objects in a characteristic order. In some embodiments, the authentication sequence can be a card-swipe sequence. As described above, a card-swipe authentication system may be implemented to authorize a user at, for example, an ATM or point of sale terminal using only card swipes, without the need of entering a PIN or other identification information. The operations described with respect to process 300 illustrated by FIG. 3 can be used to implement such a system and authenticate a user using a card-swipe sequence. Process 300 can include operations of detecting a swipe of a first card and storing information related to the card, detecting a swipe of a second and storing information related to the second card, determining if additional swipes are needed to authenticate the user, detecting an additional card swipe from the first card, second card, or additional card(s), confirming the entered card-swipe sequence, and authenticating the user based on the card-swipe sequence. Process 300 may be executed by terminal 102 or authentication server 103. In some embodiments, process 300 may be executed in part by terminal 102 and in part by authentication server 103.

According to disclosed embodiments, process 300 may be used to authenticate the user and grant the user access to a financial account. In some embodiments, the financial account may be an account associated with the first card. In other embodiments, the financial account may be associated with a different card than the first card. For example, authentication server 103 or financial service system 104 may have a stored preferred account associated with a card-swipe sequence. While enrolling, the user may provide a preferred account or choose an account to access each time the user's card authentication sequence is used. In some embodiments, the cards used for the card-swipe authentication process may not be associated with the chosen account. For example, the first card and the second card may not be associated with the financial account, but process 300 may still comprise granting the user access to the financial account. In other embodiments, one or more of the cards used for the card-swipe authentication process may be associated with the chosen account.

In some embodiments, terminal 102 may present the user with an option to choose an account to access. The option may be presented after the user has swiped one or more cards. In some embodiments, the option may provide a choice between two or more accounts, each associated with at least one of the swiped cards (e.g., a check card issued for a checking account, an ATM card issued for a savings account, a credit card issued for a line of credit, or the like). In various embodiments, the option may indicate accounts not associated with any of the swiped cards (e.g., one or more accounts that are associated with the overall card-swipe sequence, but are not associated with the individual cards included in the card-swipe sequence). In some embodiments, the terminal 102 may display the option to the user after the first card swipe is received. In other embodiments, the option may not be displayed until multiple swipes have been received, or the terminal has confirmed the card-swipe sequence.

As an example, a user may have enrolled in the card-swipe authentication system using three cards: a debit card associated with a checking account at Bank A, a debit card associated with a checking account at Bank B, and a credit card from Bank C. When enrolling in the system, the user may have indicated that she wanted a selection between the Bank A account or the credit account of Bank C. Accordingly, when the user successfully enters her card-swipe sequence at a point of sale terminal, the user may be prompted with a choice between charging the purchase to the Bank A or Bank C accounts. The choice of Bank A or Bank C accounts may determine the authentication server used to authenticate access. For example, when the Bank A account is selected, the card-swipe sequence can be sent to a authentication server associated with Bank A, which may compare the sequence to an authentication sequence for the Bank A account. When the Bank B account is selected, the card-swipe sequence can be sent to an authentication server associated with Bank B, which may compare the sequence to an authentication sequence for the Bank B account.

As another example, a user may have enrolled in a card-swipe authentication system using two cards: a credit card from Bank A and an expired credit card from the same bank. The user may also have a checking account with bank A. The user may enroll (through a user device executing process 600 below) in a card-swipe authentication system such that she can swipe her active bank A credit card and her inactive Bank A credit card to access her Bank A checking account.

The disclosed embodiments are not limited to receiving swipes of active cards. For example, the first card or second card may be inactive. In some cases, using an inactive (e.g., expired) card may provide additional security, as the user can be authenticated without risking the copying of card information from another valid card. Should a malicious actor obtain the card information for the inactive card, the malicious actor may be unable to use that card information to purchase items or access the user's account. As an example, a user may use an active bank A debit card and an expired bank A debit or credit card to form a sequence of card swipes.

At step 301, process 300 may include detecting a first swipe of a card. Through the first swipe of the first card, terminal 102 can receive information associated with the first card. First card information can include the card number, card expiration, an account number associated with the card, etc. The first card associated may be associated with a user. In some embodiments, the first card may be associated with a financial account of the user. The first card may be associated with a financial institution. In some embodiments, the first card may be associated with a financial account of the user with the financial institution.

According to disclosed embodiments, terminal 102 (or computing device 101) may provide feedback to the user to indicate that a swipe was received. In some embodiments, terminal 102 may contain a screen that provides a visual output to the user indicating that the swipe was successfully received. The visual output can be a flash of light, display of a graphic or icon, a change in screen color, or other visual output capable of indicating that a swipe was received. In other embodiments, feedback may be an auditory or haptic indication, for example, a noise, vibration, etc.

At step 302, process 300 may include storing the first card information associated with the first card. First card information may be received by terminal 102 from the swipe of the card at step 301. According to disclosed embodiments, storing may comprise storing the information in local memory on terminal 102. For example, terminal 102 may receive a swipe of a debit card and the terminal may store the card number and expiration associated with the card. In various embodiments, terminal 102 can store a hash or other function of the card information in local memory. In some embodiments, terminal 102 may store this information in a temporary memory.

At step 303, process 300 may include detecting a second swipe. The second swipe may be detected as described above with respect to detecting first swipe in step 301. In some embodiments, the second swipe can be obtained in a different manner than the first swipe. For example, the first swipe may be through a magnetic stripe reader and subsequent swipes may use a contactless nearfield communications method. The second swipe may be of a second card associated with the user. In some embodiments, the second card may be associated with a financial account of the user. The second card's financial account may be the same or a different financial account than that of the first card. The second card may also be associated with a different financial institution than the first card.

At step 304, process 300 may include storing second card information associated with the second card. Second card information may be received by terminal 102 by the swipe of the second card, for example, in step 303. Storing the second card information may be performed as described above with respect to storing first card information at step 302. For example, terminal 102 may receive a swipe of a debit card and the terminal may store the card number and expiration associated with the card, or a hash or function thereof, in local memory.

At step 306, process 300 may include determining that additional swipes are needed. For example, terminal 102 may have a prestored value for the number of swipes required for each customer enrolled in the card-swipe authentication system. After receiving a number of swipes, terminal 102 may compare the number of swipes received with the number of swipes required. If other embodiments, terminal 102 may receive the value of the required number of swipes from authentication server 103 or financial service system 104. For example, after receiving first card information from the first card swipe at step 301, terminal 102 may be configured to send an indication to authentication server 103 or financial service system 104 that a user requests authentication at terminal 102 using card swipes. The indication may include the card number, financial account number, or other user identifier. In some embodiments, as described in greater detail below, the indication may be encrypted or may be a hash or other function of card number, financial account number, user identifier, etc. Upon receiving the indication from terminal 102, authentication server 103 or financial service system 104 may send the required number of swipes associated with the user back to terminal 102. As described in greater detail below with respect to FIG. 6, authentication server 103 or financial service system 104 may have the required number of swipes for a user pre-stored from the user's enrollment data.

If the number of received swipes equals the number of swipes required, no additional swipes are needed and terminal 102 may proceed to step 308. If the number of swipes is less than the number of swipes required, terminal 102 may proceed back to step 307 and detect an additional swipe. After detecting the additional swipe, terminal 102 may proceed back to step 306 and determine if further additional steps are needed. This loop may continue until terminal 102 has received the required number of swipes.

The disclosed embodiments are not limited to embodiments in which the detected number of swipes is compared to a predetermined number to determine whether additional swipes are needed. In some embodiments, terminal 102 may receive a user input indicating completion of the sequence of cards swipes. For example, a user may interact with a user interface of terminal 102 (e.g., by selecting an option on a touch screen or pushing a button on a keypad, or the like) to indicate that the user has completed the sequence of card swipes. In some embodiments, terminal 102 may be configured to determine that the user has completed entering a card-swipe sequence upon expiration of a time (e.g., an overall time or a time from the last swipe). For example, terminal 102 may be configured to determine that the sequence is complete after receiving no swipes for 15 seconds, within 30 seconds of receiving the first swipe, or the like.

In some embodiments, process 300 may include prompting the user to enter a swipe of a card. Prompting may occur, for example, after a first swipe, or a subsequent swipe has been detected. Prompting may comprise, for example, displaying a prompt to the user on a display of terminal 102 for the user to enter an additional card swipe. In some embodiments, terminal 102 may prompt a user for an additional swipe even though no additional swipes are needed. In such a case, consistent with disclosed embodiments, terminal 102 may receive an indication from a user than no additional swipes are needed. For example, the user may select a "end sequence" button on a touch screen or push a specific button on a keypad of terminal 102.

At step 307, process 300 may include detecting an additional card swipe. The additional card swipe may be of the first card or the second card. In some embodiments, detecting an additional swipe may comprise detecting one or more swipes of one more additional cards (e.g., a third card). In some embodiments, the sequence of card swipes may comprise a combination of three or more swipes of at least one of the first card or the second card. For example, a sequence of cards swipes may comprise a swipe of a first card, a swipe of a second card, and a second swipe of the second card. As another example, a sequence of cards swipes may comprise a swipe of a first card, a swipe of a second card, a second swipe of the second card, and a swipe of a third card. A third exemplary sequence of card swipes may comprise a swipe of a first card, a second swipe of the first card, a swipe of a second card, a swipe of a third card, and a second swipe of the second card.

Disclosed embodiments are not limited to embodiments in which swipes are received from multiple cards. For example, in some embodiments, multiple swipes may be received from a single card.

In some embodiments, when terminal 102 detects an additional swipe of a card and the card has not been previously swiped as a part of the sequence (e.g., the first swipe of a third card), at step 306 process 300 may also include storing information associated with the new card.

At step 308, process 300 may include confirming the received sequence of card swipes. The sequence of card swipes may include the order in which each of the card swipes was received by terminal 102. In some embodiments, terminal 102 or authentication server 103 may confirm the sequence of card swipes. According to disclosed embodiments, terminal 102 can confirm the sequence of card swipes by sending the sequence to authentication server 103. For example, terminal 102 may send an identifier of each swiped card along with the order in which the cards were swiped. Based on the received sequence of card swipes, authentication server 103 may compare the received sequence of cards swipes with a stored card identification sequence corresponding to the user. Authentication server 103 may make the comparison by comparing each of the received swipes with each of the swipes in the stored card identification sequence. For example, authentication server 103 may compare the first swipe with the first swipe of the stored card identification sequence. If the cards match, authentication server 103 may compare the second swipe received swipe to the second swipe of the stored card identification sequence. Authentication server may continue to compare each swipe in order until the end of the sequence is reached. If each of the swipes match, authentication server 103 may determine that the comparison is successful. If the comparison is successful, authentication server 103 or financial service system 104 may then send an indication that the sequence is confirmed to terminal 102.

In some embodiments, success of the comparison may be determined by using a similarity threshold. The similarity threshold may be predetermined and stored in authentication server 103. In some embodiments, authentication server 103 may be configured to receive the similarity threshold from financial service system 104. In some embodiments, the similarity threshold may be a minimum percentage of accuracy of card swipes that must be met in order to determine that the authentication information and enrollment information match and indicate a successful comparison. For example, a similarity threshold may require 95% percent accuracy to determine a match. If all swipes in the sequence are correct, the sequence would be 100% accurate and the information may successfully match. However, if only four out of five swipes are correct, the sequence would be 80% accurate. Because the 80% accuracy level would not exceed the required 95% accuracy, the information may not successfully match and the comparison may not be successful.

In some embodiments, the similarity threshold may be a threshold match score. Authentication server 103 may be configured to generate a match score based on the enrollment and authentication information. The match score may be a quantitative value providing an indication of the level of similarity between the enrollment information and received authentication information. For example, a perfect match score may result if the authentication information entered by a user at a terminal exactly matches the stored enrollment information. As another example, a match score of zero may result if none of the received authentication information matches the stored enrollment information. If the match score exceeds the threshold match score, authentication server 103 may determine that the information matches and the comparison is successful.

In some embodiments, terminal 102 may send hashed card information to authentication server 103. For example, instead of sending the actual card number to authentication server 103, terminal 103 may transmit a hash (or other function) of the card number. Sending the hash (or other function) of a card number can add additional security to the process by preventing the need for the actual card number to be sent, thus reducing the odds that the card number may be stolen. The authentication server 103 or financial service system 104 need not even store the actual card number. As described in greater detail below with respect to FIG. 6, authentication server 103 or financial service system 104 may only ever receive and store the hashed card number (or function of the card number). This may be especially useful when a user includes a card in his sequence of card swipes that is not associated with the financial service provider (e.g., Bank A) operating the card-swipe authentication system. For example, by sending a hash of card information, a user can incorporate a card of a different institution (e.g., Bank B) into Bank A's card-swipe authentication system without the actual Bank B card information being stored by Bank A's servers.

In some embodiments, terminal 102 may receive the required card identification sequence from authentication server 103. In such embodiments, terminal 102 may confirm sequence of card swipes by comparing the sequence of card swipes received from the user with the required card identification sequence. The comparison may occur substantially as the comparison conducted by authentication server 103 described above. In some embodiments, terminal 102 may also store the required card identification sequence locally.

At step 309, process 300 may include authenticating the user based on the results of the confirmation. For example, when the confirmation is successful, the user may be authenticated. When the authentication server 103 or financial service system 104 performs the confirmation, authentication server 103 or financial service system 104 can provide an indication to terminal 102 that the user has been authenticated. As a non-limiting example, authentication server 103 can provide an authentication token or key to terminal 102 than can be used to access the account of the user. The disclosed embodiments are not limited to any particular method of indicating authentication. In some embodiments, terminal 102 can perform the comparison and then provide an indication of authentication to the user. In such embodiments, terminal 102 may be able to access the account of the user once it has authenticated the user.

Regardless of whether confirmation is performed by authentication server 103 or terminal 102, when the sequence is not confirmed (e.g., the user swiped the correct number of cards, but did not swipe the correct specific cards or used an incorrect order), the user may receive an indication that they have not been authenticated. In such situations, based on the result of the confirmation, the user may not be granted access to the desired account.

The disclosed embodiments are not limited to storing the card information on local memory on terminal 102. In some embodiments, terminal 102 may transmit the information to a database or other remote storage device. For example, terminal 102 may transmit the card information to a database in communication with network 105. In some embodiments, terminal 102 may send the card information to authentication server 103 or financial service system 104. As discussed in greater detail below, terminal 102 may send a hash or other function of the card information to authentication server 103 or financial service system 104.

FIG. 4 is a flowchart depicting an exemplary process 400 for authenticating a user using an authentication sequence. The authentication sequence can include providing multiple authentication objects in a characteristic order with a characteristic timing between presentations of authentication objects. In some embodiments, the authentication sequence can be a card-swipe sequence. Process 400 may correspond to parts of process 300 shown in FIG. 3 and, accordingly, descriptions of the components and processes therein may apply to process 400 as well. Process 400 can include operations of detecting a swipe of a first card and storing information related to the card, detecting a swipe of a second card and storing information related to the second card, tracking the amount of elapsed time between the first and second swipes, determining if additional swipes are needed to authenticate the user, detecting an additional card swipe from the first card, second card, or a third card, tracking the amount of time between the previous swipes, confirm the entered card-swipe sequence (which may include verifying the correct elapsed time between swipes), and authenticating the user based on the card-swipe sequence. Process 400 may be executed by terminal 102 or authentication server 103. In some embodiments, process 400 may be executed in part by terminal 102 and in part by authentication server 103.

According to disclosed embodiments, process 400 may be used to authenticate the user and grant the user access to a financial account. In some embodiments, the financial account may be an account associated with the first card. In other embodiments, the financial account may be associated with a different card than the first card. For example, authentication server 103 or financial service system 104 may have a stored preferred account associated with a card-swipe sequence. While enrolling, the user may provide a preferred account or choose an account to access each time the user's card authentication sequence is used. In some embodiments, the cards used for the card-swipe authentication process may not be associated with the chosen account. For example, the first card and the second card may not be associated with the financial account, but the process 400 may still comprise granting the user access to the financial account. In other embodiments, one or more of the cards used for the card-swipe authentication process may be associated with the chosen account. As discussed above with respect to FIG. 3, in some embodiments, terminal 102 may present the user with an option to choose an account to access.

As described above with respect to FIG. 3, the disclosed embodiments are not limited to receiving swipes of active cards. For example, the first card or second card may be inactive.

At step 401, process 400 may include a swipe of a first card. As described above with respect to FIG. 3, through the first swipe of the first card, terminal 102 can receive information associated with the first card. The first card information can include the card number, card expiration, an account number associated with the first card, etc. The first card may be associated with a user. In some embodiments, the first card may be associated with a financial account of the user. The first card may also be associated with a financial institution. In some embodiments, the first card may be associated with a financial account of the user with the financial institution.

As described above with respect to FIG. 3, terminal 102 may provide feedback to the user to indicate that a swipe was received. For example, terminal 102 may contain a screen that provides a visual output to the user indicating that the swipe was successfully received. In other embodiments, feedback may be another visual or auditory indication, for example a flash of light, a noise, etc.

At step 402, process 400 may include storing the first card information associated with the first card. First card information may be received by terminal 102 from the swipe of the card at step 401. Storing may occur substantially as described in step 302 of FIG. 3.

At step 403, process 400 may include detecting a second swipe. The second swipe may be detected as described above with respect to detecting first swipe in step 401. The second swipe may be of a second card associated with the user. In some embodiments, the second card may be associated with a financial account of the user. The second card's financial account may be the same or a different financial account than that of the first card. The second card may also be associated with a different financial institution than the first card.

Disclosed embodiments are not limited to receiving swipes from multiple cards. For example, in some cases, multiple swipes from a single card may be received.

At step 404, process 400 may include storing second card information associated with the second card. The second card information may be received by terminal 102 by the swipe of the second card, for example, in step 403. Storing the second card information may be performed as described above with respect to storing first card information at step 402.

At step 405, process 400 may include tracking an amount of elapsed time between the first and second card swipes. The amount of elapsed time may be the amount of time the user waits after swiping the first card before swiping a card again. Tracking the amount of elapsed time may include storing the amount of elapsed time, or a function thereof. For example, terminal 102 may determine that 6 seconds elapsed between the first swipe detected and the second swipe detected and may store the 6 second value in temporary memory. In some embodiments, terminal 102 may transmit the elapsed time, or a function thereof, to authentication server 103 or financial service system 104 for storage.

In some embodiments, process 400 may include (not pictured) providing a visual indication of the elapsed time to the user. The visual indication may begin after the user has swiped the first card. In some embodiments, the visual indication of the elapsed time indication may be a timer displayed on a screen of terminal 102. For example, terminal 102 may display a clock face indicating the seconds elapsed since the first swipe. As another example, terminal 102 may display the number of seconds elapsed since the first swipe. In some embodiments, the visual indication of the elapsed time may be a repeating flash of light. For example, terminal 102 may include a small LED or other light source that flashes repeatedly (e.g., once each second). As another nonlimiting example, a screen of terminal 102 may flash repeatedly. The flash of the light source or screen may indicate to the user of how much time has elapsed between swipes. For example, if one flash occurs each second, the user may determine the amount of elapsed time by counting the number of flashes between swipes. In some cases, the visual indication may start flashing after the first swipe is detected and stop flashing when a second swipe is detected. The visual indication may also reset after each time a swipe is detected.

At step 406, process 400 may include determining that additional swipes are needed. The determining may be done substantially as described in step 306 of FIG. 3. For example, terminal 102 may have a prestored value for the number of swipes required for each customer enrolled in the card-swipe sequence program. After receiving a number of swipes, terminal 102 may compare the number of swipes received with the number of swipes required. If other embodiments, terminal 102 may receive the value of the required number of swipes from authentication server 103 or financial service system 104. For example, after receiving first card information from the first card swipe at step 401, terminal 102 may be configured to send an indication to authentication server 103 or financial service system 104 that a user requests authentication at terminal 102 using card swipes. The indication may be the card number, financial account number, or other user identifier. In some embodiments, as described in greater detail below, the indication may be encrypted or may be a hash or other function of card number, financial account number, user identifier, etc. Upon receiving the indication from terminal 102, authentication server 103 or financial service system 104 may send the required number of swipes associated with the user back to terminal 102. As described in greater detail below with respect to FIG. 6, authentication server 103 or financial service system 104 may have the required number of swipes for a user pre-stored from the user's enrollment data.

If the number of received swipes equals the number of swipes required, no additional swipes are needed and terminal 102 may proceed to step 409. If the number of swipes is less than the number of swipes required, terminal 102 may proceed to steps 407 and 408. This loop may continue until terminal 102 has received the required number of swipes.

As described above with respect to FIG. 3, the disclosed embodiments are not limited to determining that additional swipes are needed. For example, terminal 102 may receive a user input indicating completion of the sequence of cards swipes or may timeout.

In some embodiments, process 400 may include prompting the user to enter a swipe of a card. Prompting may occur, for example, after a first swipe, or a subsequent swipe has been detected. Prompting may comprise, for example, displaying a prompt to the user on a display of terminal 102 for the user to enter an additional card swipe. In some embodiments, terminal 102 may prompt a user for an additional swipe even though no additional swipes are needed. In such a case, consistent with disclosed embodiments, terminal 102 may receive an indication from a user than no additional swipes are needed. For example, the user may select an "end sequence" button on a touch screen or push a specific button on a keypad of terminal 102.

At step 407, process 400 may include detecting an additional card swipe. The additional card swipe may be of the first card or the second card. In some embodiments, detecting an additional swipe may comprise detecting one or more swipes of one more additional cards (e.g., a third card). In some embodiments, the sequence of card swipes may comprise a combination of three or more swipes of at least one of the first card or the second card. For example, a sequence of card swipes may comprise a swipe of a first card, a swipe of a second card, and a second swipe of the second card. As another example, a sequence of card swipes may comprise a swipe of a first card, a swipe of a second card, a second swipe of the second card, and a swipe of a third card. A third exemplary sequence of card swipes may comprise a swipe of a first card, a second swipe of the first card, a swipe of a second card, a swipe of a third card, and a second swipe of the second card.

Disclosed embodiments are not limited to just receiving a swipe of a first card, followed by a swipe a of a second card, then receiving additional swipes. For example, terminal 102 may receive a swipe of a first card, followed by a second swipe of the first card, then a swipe of the second card.

In some embodiments, when terminal 102 detects an additional swipe of a card and the card has not been previously swiped as a part of the sequence (e.g., the first swipe of a third card), at step 407 process 400 may also include storing information associated with the new card.

At step 408, process 400 may include tracking the amount of elapsed time between previous detected card swipes. Tracking may occur as described above with respect to step 405. Tracking is not limited to tracking the amount of elapsed time between a swipe and the swipe immediately following it. For example, tracking may include tracking the amount of elapsed time between the first swipe and a third swipe, with or without regard to when the second swipe occurred between the first and third swipes.

At step 409, process 400 may include confirming the received sequence of card swipes. The sequence of card swipes may comprise the order of each of the swipes received by terminal 102. In some embodiments, terminal 102 or authentication server 103 may confirm the sequence of card swipes. In some embodiments, terminal 102 may send the card information, swipe types, and swipe sequence to authentication server 103 for confirmation. Confirming the received sequence of card swipes may include determining that the amount of elapsed time between each swipe falls within a predetermined time range. For example, terminal 102 may have tracked the time between the first and second swipes as seven seconds. A predetermined time range for the time between the first and second swipes may be five to eight seconds. Accordingly, authentication server 103 may determine that the elapsed time between the first and second swipes fell within the predetermined time range. If the order of the swipes and the timing of the swipes are correct, terminal 102 may confirm that the received sequence of card swipes is correct. Authentication server 103 may make the comparison by comparing each of the received swipes with each of the swipes in the stored card identification sequence, along with the timing of each swipe. For example, authentication server may compare the first swipe with the first swipe of the stored card identification sequence. If the cards match, authentication server 103 may compare the second swipe received swipe to the second swipe of the stored card identification sequence. Authentication server may then compare the received time between the first and second swipes with the stored timing requirement. Authentication server may continue to compare each swipe (and timing requirement) until the end of the sequence is reached. If each of the swipes match, authentication server 103 may determine that the comparison is successful.

According to disclosed embodiments, terminal 102 can confirm the sequence of card swipes by sending the sequence and timing to authentication server 103 or financial service system 104. For example, terminal 102 may send an identifier of each swiped card along with the order in which the cards were swiped and the elapsed time between the swipes. Based on the received sequence of card swipes, authentication server 103 may compare the received sequence of cards swipes with a stored card identification sequence corresponding to the user. If the comparison is successful, authentication server 103 may then send an indication that the sequence is confirmed to terminal 102.

In some embodiments, success of the comparison may be determined by using a similarity threshold. The similarity threshold may be predetermined and stored in authentication server 103. In some embodiments, authentication server 103 may be configured to receive the similarity threshold from financial service system 104. In some embodiments, the similarity threshold may be a minimum percentage of accuracy of card swipes and timing that must be met in order to determine that the authentication information and enrollment information match and indicate a successful comparison. For example, a similarity threshold may require 85% percent accuracy to determine a match. If all swipes and timing in the sequence are correct, the sequence would be 100% accurate and the information may successfully match. However, if in a sequence, all five of five swipes are correct, but only four out of five timings are correct, the sequence would be 90% accurate in total. Because the 90% accuracy level would exceed the required 85% accuracy, the information may successfully match, and the comparison may be successful. However, as another example, if a received sequence has four out of five correct swipes and four out of five correct timings, the total accuracy would be 80%. Because the 80% accuracy level would not exceed the required 85% accuracy, the information may not successfully match, and the comparison may not be successful. In some embodiments, the card swipes and timing may be weighted differently. For example, the card swipes and timing may be weighted such that more importance is placed on the accuracy of the swipes, as opposed to the timing requirements.

As described above with respect to FIG. 3, in some embodiments, the similarity threshold may be a threshold match score. Authentication server 103 may be configured to generate a match score based on the enrollment and authentication information. The match score may be a quantitative value providing an indication of the level of similarity between the enrollment information and received authentication information. For example, a perfect match score may result if the card swipes and timing entered by a user at a terminal exactly matches the stored enrollment information. As another example, a match score of zero may result if none of the received authentication information matches the stored enrollment information. If the match score exceeds the threshold match score, authentication server 103 may determine that the information matches and the comparison is successful.

As described above with respect to FIG. 3, in some embodiments, terminal 102 may send hashed card information to authentication server 103. For example, instead of sending the actual card number to authentication server 103, terminal 103 may transmit a hash (or other function) of the card number. Sending the hash (or other function) of a card number can add additional security to the process by preventing the need for the actual card number to be sent, thus reducing the odds that the card number may be stolen. The authentication server 103 or financial service system 104 need not even store the actual card number. As described in greater detail below with respect to FIG. 6, authentication server 103 may only ever receive and store the hashed card number (or function of the card number). This may be especially useful when a user includes a card in his card identification sequence that is not associated with the financial service provider (e.g., Bank A) operating the card-swipe authentication system. For example, by sending a hash of card information, a user can incorporate a card of a different institution (e.g., Bank B) into Bank A's card-swipe authentication system without the actual Bank B card information being stored by Bank A's servers.

In some embodiments, terminal 102 may receive the required card identification sequence and the predetermined time ranges for the elapsed time between swipes from authentication server 103. In such embodiments, terminal 102 may confirm sequence of card swipes by comparing the sequence of card swipes and timing received from the user with the required card identification sequence, including timing, substantially as described above. In some embodiments, terminal 102 may also store the required card identification sequence (and predetermined time ranges) locally.

At step 410, process 400 may include authenticating the user based on the results of the confirmation. As described above with respect to FIG. 3, when the authentication server 103 performs the confirmation, the authentication server 103 or financial service system 104 can provide an indication to terminal 102 that the user has been authenticated. As a non-limiting example, authentication server 103 can provide an authentication token or key to terminal 102 than can be used to access the account of the user. The disclosed embodiments are not limited to any particular method of indicating authentication. In some embodiments, terminal 102 can perform the comparison and then provide an indication of authentication to the user. In such embodiments, terminal 102 may be able to access the account of the user once it has authenticated the user.

Regardless of whether confirmation is performed by authentication server 103, or terminal 102, when the sequence is not confirmed (e.g., the user swiped the correct number of cards, but did not swipe the correct specific cards, used an incorrect order, or did not swipe the cards with the correct timing), the user may receive an indication that they have not been authenticated. In such situations, based on the result of the confirmation, the user may not be granted access to the desired account.

The disclosed embodiments are not limited to storing the card information on local memory on terminal 102. In some embodiments, terminal 102 may transmit the information to a database or other remote storage device. For example, terminal 102 may transmit the card information to a database in communication with network 105. In some embodiments, terminal 102 may send the card information to authentication server 103 or financial service system 104. As described with respect to FIG. 3 above, terminal 102 may send a hash of the card information to authentication server 103 or financial service system 104.

FIG. 5 is a flowchart depicting an exemplary process 500 for authenticating a user using a card-swipe sequence. Process 500 may correspond to parts of processes 300 and 400 shown in FIGS. 3 and 4, accordingly, descriptions of the components and processes therein may apply to process 500 as well. Process 500 can include operations of detecting a swipe of a first card, tracking the type of swipe, storing information related to the card, detecting a swipe of a second card, tracking the type of swipe, storing information related to the second card, determining if additional swipes are needed to authenticate the user, detecting an additional card swipe from the first card, second card, or a third card, tracking the additional swipe type, confirming the entered card-swipe sequence (which may include verifying the correct swipe type), and authenticating the user based on the card-swipe sequence. Process 500 may be executed by terminal 102 or authentication server 103. In some embodiments, process 500 may be executed in part by terminal 102 and in part by authentication server 103.

At step 501, process 500 may include detecting a swipe of a first card. As described above, a swipe may include, for example, a swipe of a card through a magnetic stripe reader, inserting a card into a chip reader, transfer of data through a contactless method, etc. In some embodiments, swipes may occur in two or more forms. For example, the first swipe may be through a magnetic stripe reader and subsequent swipes may use a contactless nearfield communications method. As described above with respect to FIG. 3, through the first swipe of the first card, terminal 102 can receive information associated with the first card. First card information can include the card number, card expiration, an account number associated with the card, etc. The first card may be associated with a user. In some embodiments, the first card may be associated with a financial account of the user. The first card may also be associated with a financial institution. In some embodiments, the first card may be associated with a financial account of the user with the financial institution. As described above with respect to FIG. 3, terminal 102 may provide feedback to the user to indicate that a swipe was received.

At step 502, process 500 may include tracking a type of the first swipe. As described above, various types of card readers and types of swipes are possible. In some cases, terminal 102 may provide multiple ways to receive a card swipe (e.g. a swipe through magnetic stripe reader, a chip reader, Bluetooth, an RFID receiver, an NFC receiver, and the like). Accordingly, each of these different ways of receiving a swipe may each correspond to a type of swipe. In some embodiments, terminal 102 may be configured to track the type of swipe that was detected. Tracking may include storing the type of the swipe in local memory. In some embodiments, terminal 102 may transmit the type of swipe to authentication server 103 or financial service system 104.

Tracking a type of swipe may also include tracking an orientation of the swipe. Some card readers, for example some magnetic stripe readers, are capable of receiving a card swipe in multiple directions. For example, some readers that require the card be inserted in to the read and pulled back out can read the card regardless of whether the card is inserted face-up or face-down. Similarly, swipe-through card readers (a magnetic stripe card reader with two open ends in which a swipe is registered by moving the card through the reader in a single direction) can receive swipes in multiple directions. In some embodiments, the orientation of a swipe may be a direction a card is swiped in a card reader or the orientation of a card within a card reader. For example, a swipe-through type reader may be positioned vertically, permitting a user to swipe a card through the reader from bottom to top (e.g., upwards) or from top to bottom (e.g., downwards). As another example, an insert-type card reader may receive a card with the magnetic strip facing down or with the magnetic stripe facing up. In some cases, an insert-type card reader may also be able to read the card with the magnetic stripe on the left, or with the magnetic stripe on the right. Accordingly, in some embodiments, terminal 102 may track the type of card swipe (e.g., whether the swipe is via magnetic stripe or NFC method, whether the swipe is top-down or bottom up, whether a magnetic stripe is facing to the left or to the right, or the like). Tracking may include storing the type of a swipe in local memory. In some embodiments, terminal 102 may transmit the type of a swipe to authentication server 103 or financial service system 104.

According to disclosed embodiments and as described further below, terminal 102 may track the type of swipe for all swipes received in a card-swipe sequence. However, the disclosed embodiments are not limited to embodiments tracking the type of all swipes. For example, terminal 102 may track the type of a subset of the swipes received in a given sequence. In some embodiments, as described in greater detail below with respect to FIG. 6, a user may indicate which swipes are to have their type tracked.

At step 503, process 500 may include storing the first card information associated with the first card. First card information may be received by terminal 102 from the swipe of the card at step 501. Storing may be done substantially as described in step 302 of FIG. 3. For example, terminal 102 may receive a swipe of a debit card and the terminal may store the card number and expiration associated with the card. In some embodiments, terminal 102 may store this information in temporary memory. As described above with respect to FIGS. 3 and 4, the disclosed embodiments are not limited to storing the card information on local memory on terminal 102.

At step 504, process 500 may include detecting a second swipe. The second swipe may be detected as described above with respect to detecting first swipe in step 501. The second swipe may be of a second card associated with the user. In some embodiments, the second card may be associated with a financial account of the user. The second card's financial account may be the same or a different financial account than that of the first card. The second card may also be associated with a different financial institution than the first card. Disclosed embodiments are not limited to receiving swipes from multiple cards. For example, in some cases, multiple swipes from a single card may be received.

At step 505, process 500 may include tracking a type of the second swipe. Tracking a type of the second swipe may occur as described with respect to step 502 above. In some embodiments, the second swipe may be detected by a different type of card reader than that detected the first swipe.

At step 506, process 500 may include storing second card information associated with the second card. Second card information may be received by terminal 102 by the swipe of the second card, for example, in step 504. Storing the second card information may be performed as described above with respect to storing first card information at step 503. For example, terminal 102 may receive a swipe of a debit card and the terminal may store the card number and expiration associated with the card in local memory. As described above with respect to FIGS. 3 and 4, the disclosed embodiments are not limited to receiving swipes of active cards. For example, the first card or second card may be inactive.

At step 507, process 500 may include determining that additional swipes are needed. For example, terminal 102 may have a prestored value for the number of swipes required for each customer enrolled in the card-swipe authentication system. After receiving a number of swipes, terminal 102 may compare the number of swipes received with the number of swipes required. If other embodiments, terminal 102 may receive the value of the required number of swipes from authentication server 103 or financial service system 104. For example, after receiving first card information from the first card swipe at step 501, terminal 102 may be configured to send an indication to authentication server 103 or financial service system 104 that a user requests authentication at terminal 102 using card swipes. The indication may be the card number, financial account number, or other user identifier. In some embodiments, as described in greater detail below, the indication may be encrypted or may be a hash (or other function) of a card number, financial account number, user identifier, etc. Upon receiving the indication from terminal 102, authentication server 103 or financial service system 104 may send the required number of swipes associated with the user back to terminal 102. As described in greater detail below with respect to FIG. 6, authentication server 103 or financial service system 104 may have the required number of swipes for a user prestored from the user's enrollment data.

If the number of received swipes equals the number of swipes required, no additional swipes are needed and terminal 102 may proceed to step 510. If the number of swipes is less than the number of swipes required, terminal 102 may proceed back to step 507 and detect an additional swipe. This loop may continue until terminal 102 has received the required number of swipes.

As described above with respect to FIGS. 3 and 4, the disclosed embodiments are not limited to determining that additional swipes are needed. For example, in some embodiments, terminal 102 may receive a user input indicating completion of the sequence of cards swipes or may timeout.

As described above with respect to FIGS. 3 and 4, in some embodiments, process 500 may include prompting the user to enter a swipe of a card.

At step 508, process 500 may include detecting an additional card swipe. The additional card swipe may be of the first card or the second card. In some embodiments, detecting an additional swipe may comprise detecting one or more swipes of one more additional cards (e.g., a third card). In some embodiments, the sequence of card swipes may comprise a combination of three or more swipes of at least one of the first card or the second card. For example, a sequence of cards swipes may comprise a swipe of a first card, a swipe of a second card, and a second swipe of the second card. As another example, a sequence of cards swipes may comprise a swipe of a first card, a swipe of a second card, a second swipe of the second card, and a swipe of a third card. A third exemplary sequence of card swipes may comprise a swipe of a first card, a second swipe of the first card, a swipe of a second card, a swipe of a third card, and a second swipe of the second card.

Disclosed embodiments are not limited to just receiving a swipe of a first card, followed by a swipe a of a second card, then receiving additional swipes. For example, terminal 102 may receive a swipe of a first card, followed by a second swipe of the first card, then a swipe of the second card.

In some embodiments, when terminal 102 detects an additional swipe of a card and the card has not been previously swiped as a part of the sequence (e.g., the first swipe of a third card), at step 507 process 500 may also include storing information associated with the new card.

At step 509, process 500 may include tracking the type of an additional swipe. Tracking may occur as described above with respect to steps 502 and 505.

At step 510, process 500 may include confirming the received sequence of card swipes. The sequence of card swipes may comprise the order of each of the swipes received by terminal 102. In some embodiments, terminal 102 may confirm the sequence of card swipes. In some embodiments, terminal 102 may send the card information, swipe types, and swipe sequence to authentication server 103 for confirmation. Confirming the received sequence of card swipes may include determining that the types of swipes correspond to required types. For example, terminal 102 may have tracked the type of the first swipe as the magnetic stripe facing down and on the right side in an insert-type card reader. If the required swipe type for the first swipe was having the magnetic stripe facing down and on the right side, authentication server 103 may confirm that swipe of the sequence. As another example, terminal 102 may also have tracked the type of the second swipe as being detected by an NFC receiver. Similarly, if the required swipe type for the second swipe was an NFC swipe, authentication server 103 may confirm the second swipe of the sequence. If the order of the swipes and the orientations or types of the swipes are correct, authentication server 103 may confirm that the received sequence of card swipes is correct. Authentication server 103 may make the comparison by comparing each of the received swipes with each of the swipes in the stored card identification sequence, along with the type. For example, authentication server may compare the first swipe with the first swipe of the stored card identification sequence. If the cards match, authentication server 103 may compare the type of the first swipe with the stored type of the first swipe. If both the first card and type match, authentication server 103 may compare the second swipe received swipe to the second swipe of the stored card identification sequence. Authentication server may continue to compare each swipe (and its type) until the end of the sequence is reached. If each of the swipes and types match, authentication server 103 may determine that the comparison is successful.

As described above, in some embodiments, terminal 102 may track and/or confirm the type of a subset of the detected swipes. For example, terminal 102 may be configured to only confirm the odd numbered swipes of the sequence (e.g., the first, third, and fifth swipes). According to disclosed embodiments and as further described below with respect to FIG. 6, terminal 102 may only confirm the type of swipes that are preselected by the user to be confirmed. For example, if during enrollment, the user only requires the first and third swipes of a sequence have a specific type, terminal 102 may only track and confirm the first and third swipes. In some embodiments, terminal 102 may track the type of all detected swipes, but may only confirm a subset of the types of the swipes.

According to disclosed embodiments, terminal 102 can confirm the sequence of card swipes by sending the sequence and types to authentication server 103 or financial service system 104. For example, terminal 102 may send an identifier of each swiped card along with the order in which the cards were swiped and the type of the swipes. Based on the received sequence of card swipes, authentication server 103 (or financial service system 104) may compare the received sequence of cards swipes with a stored card identification sequence corresponding to the user. If the comparison is successful, authentication server 103 or financial service system 104 may then send an indication that the sequence is confirmed to terminal 102.

In some embodiments, success of the comparison may be determined by using a similarity threshold. The similarity threshold may be predetermined and stored in authentication server 103. In some embodiments, authentication server 103 may be configured to receive the similarity threshold from financial service system 104. In some embodiments, the similarity threshold may be a minimum percentage of accuracy of card swipes and types that must be met in order to determine that the authentication information and enrollment information match and indicate a successful comparison. For example, a similarity threshold may require 85% percent accuracy to determine a match. If all swipes and types in the sequence are correct, the sequence would be 100% accurate and the information may successfully match. However, if in a sequence, all five of five swipes are correct, but only four out of five types are correct, the sequence would be 90% accurate in total. Because the 90% accuracy level would exceed the required 85% accuracy, the information may successfully match, and the comparison may be successful. However, as another example, if a received sequence has four out of five correct swipes and four out of five correct types, the total accuracy would be 80%. Because the 80% accuracy level would not exceed the required 85% accuracy, the information may not successfully match, and the comparison may not be successful. In some embodiments, the card swipes and types may be weighted differently. For example, the card swipes and types may be weighted such that more importance is placed on the accuracy of the swipes, as opposed to accuracy of the types.

As described above with respect to FIGS. 3 and 4, in some embodiments, the similarity threshold may be a threshold match score. Authentication server 103 may be configured to generate a match score based on the enrollment and authentication information. The match score may be a quantitative value providing an indication of the level of similarity between the enrollment information and received authentication information. For example, a perfect match score may result if the card swipes and types entered by a user at a terminal exactly matches the stored enrollment information. As another example, a match score of zero may result if none of the received authentication information matches the stored enrollment information. If the match score exceeds the threshold match score, authentication server 103 may determine that the information matches and the comparison is successful As described above with respect to FIGS. 3 and 4, in some embodiments, terminal 102 may send hashed card information to authentication server 103 (or financial service system 104). For example, instead of sending the actual card number to authentication server 103, terminal 103 may transmit a hash (or other function) of the card number.

In some embodiments, terminal 102 may receive the required card identification sequence, including required types of swipes from authentication server 103. In such embodiments, terminal 102 may confirm sequence of card swipes by comparing the sequence of card swipes and types received from the user with the required card identification sequence and types. In some embodiments, terminal 102 may also store the required card identification sequence and required types locally.

At step 511, process 500 may include authenticating the user based on the results of the confirmation. When the authentication server 103 or financial service system 104 performs the confirmation, authentication server 103 or financial service system 104 can provide an indication to terminal 102 that the user has been authenticated. As a non-limiting example, authentication server 103 can provide an authentication token or key to terminal 102 than can be used to access the account of the user. The disclosed embodiments are not limited to any particular method of indicating authentication. In some embodiments, terminal 102 can perform the comparison and then provide an indication of authentication to the user. In such embodiments, terminal 102 may be able to access the account of the user once it has authenticated the user.

Regardless of whether confirmation is performed by authentication server 103 or terminal 102, when the sequence is not confirmed (e.g., the user swiped the correct number of cards, but did not swipe the correct specific cards or used an incorrect order, or the wrong type(s) of swipe) the user may receive an indication that they have not been authenticated. In such situations, based on the result of the confirmation, the user may not be granted access to the desired account.

According to disclosed embodiments, any combination of steps of methods 300-500 may be used. For example, a card-swipe authentication system may use a particular sequence of cards in a particular order, with a particular timing between at least two cards, and a particular type of swipe of one of the cards.

Figure 6:
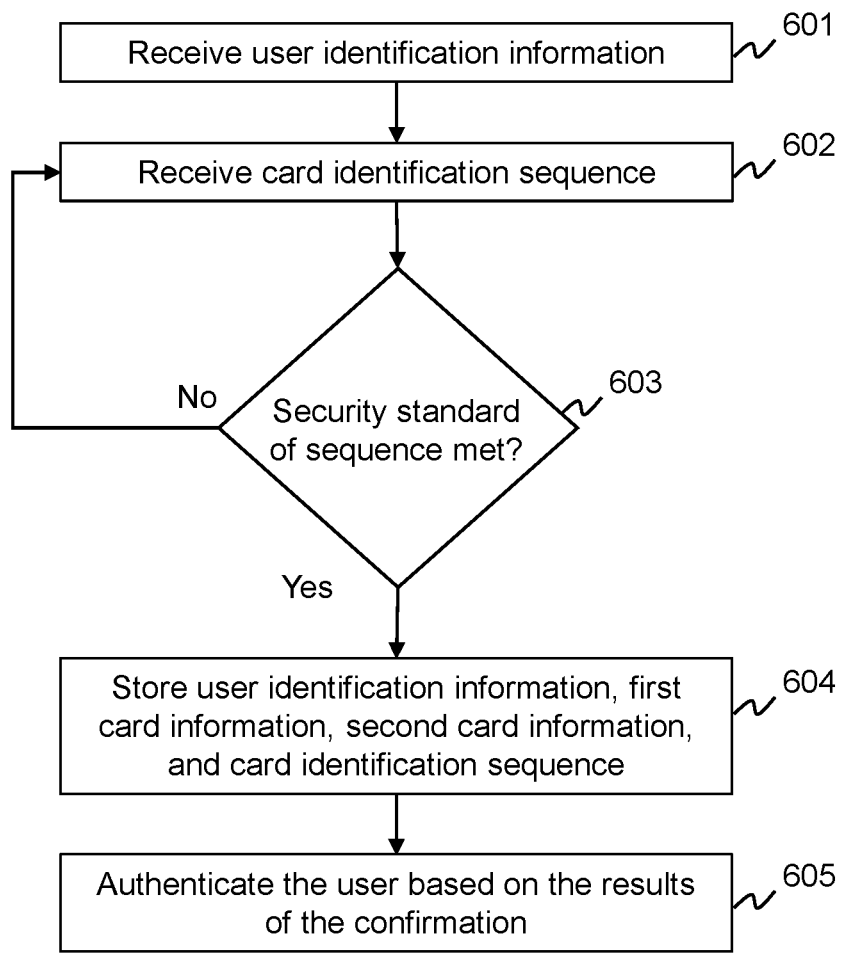
FIG. 6 is a flowchart depicting an exemplary process for enrolling a user in an authentication system in accordance with disclosed embodiments.

FIG. 6 is a flowchart depicting an exemplary process 600 for enrolling a user in an authentication system in accordance with disclosed embodiments. Process 600 can be used to receive and store user identification information, first card information, second card information, and card identification sequence (collectively "enrollment information") for later use in one or more of authentication processes 300-500. Process 600 can include operations of receiving information identifying a particular user associated with an account, receiving card information for multiple cards associated with the user, receiving a user-defined sequence of those cards to be used for authentication, checking to determine if the sequence is secure enough to satisfy a security threshold, and storing the enrollment information. As an example, these operations may permit a user with a checking account associated with a financial service provider to enroll in a card-swipe authentication system so that the user may later be authenticated at an ATM using, for example, any one or a combination of processes 300-500 described above. Process 600 can be executed by user device 101 or terminal 102. Thus, a user may become enrolled in a card sequence authentication system by physically swiping cards at a terminal location or by entering a sequence of cards on a user device, for example his personal computer or mobile device. The steps of process 600 will be primarily explained below as being executed by user device 101, but it is understood that other components of system 100 may execute one or more steps of process 600. According to disclosed embodiments, identification application 224 may facilitate performance of process 600 by user device 101. For example, identification application 224 may generate a GUI configured to receive information from a user consistent with disclosed embodiments.

In step 601, process 600 may include receiving user identification information. User identification information may be one or more pieces of information that identify a user or account associated with the user. User identification information may include one or more user identifiers, for example, name of the user, social security number, birthdate, username, email address, phone number, physical address, etc. User identification information may also include an account identifier associated with an account of the user, such as an account number. In some embodiments, user identification information may comprise a link, username or number, passcode, etc. that can be generated uniquely for the user by authentication server 103 or financial service 104. This uniquely generated user identification information may be provided to the user or the user device 101 before the user begins the enrollment process.

According to disclosed embodiments, step 601 may also include authenticating the user. For example, user device 101 may receive a username and password associated with the user and use the username and password combination to authenticate the user. In some embodiments, user device 101 may provide a prompt for entry of a username and password, or other user identification information.

In step 602, process 600 may include receiving a card identification sequence. The card identification sequence may be an order in which one or more swipes of the first card and one or more swipes of additional cards must occur in order for a user to be authenticated using the sequence. Receiving a card identification sequence may comprise receiving an indication from the user of a particular order of card swipes which the user would like to use during the authentication process. For example, user device 101 may receive a card order comprising the first card, the second card, the second card, and the first card. Such a card identification sequence would correspond to a swipe of the first card followed by two swipes of the second card, followed by another swipe of the first card. According to disclosed embodiments, the user may enter the card identification sequence into user device 101. In some embodiments, user may enter the card identification sequence using a GUI provided by identification application 224. For example, the GUI may be configured to provide one or more slots or dialogue boxes corresponding to positions within a card order in which the user may select or enter a specified card.

According to other disclosed embodiments, receiving a card identification sequence may comprise receiving a series of swipes of cards in a specific order. For example, a user may swipe the first card at user device 101 or terminal 102, then swipe the first card again, swipe the second card, and swipe the first card again. In this example, the order in which the cards are swiped (first, first, second, first) may comprise the card identification sequence.

In step 602, process 600 may include receiving first card information. First card information can be can include a card number, expiration, Card Verification Value (CVV) code, number of an account associated with the card, PIN number, or other information associated with a first card. In some embodiments, user device 101 can be configured to receive first card information from a user through I/O devices 223. As an example, user device 101 may receive first card information from a user when a user enters the information into identification application 224 using a keyboard. According to some embodiments, receiving first card information may include receiving card information through a swipe of the first card. As described above, a swipe can include, for example, a swipe of a card through a magnetic stripe reader, inserting a card into a chip reader, transfer of data through a contactless method, etc. For example, terminal 102 may receive a swipe of the first card by a user. As another example, user device 101 may have a connected card reader that receives a swipe of the first card.

According to some embodiments, the first card and first card information may be associated with a financial account of the user. For example, the user may have a checking account with a financial institution and wish to use card-swipe authentication to access his account. The user may provide card information associated with the debit card of his checking account as first card information. By providing the debit card information as the first card information, the user may indicate to the card-swipe authentication system that the account to be accessed by the authentication system is the checking account associated with the debit card.

In other embodiments, user device 101, identification application 224, and/or terminal 102 may be configured to permit the user to choose an account to which the card-swipe authentication sequence corresponds. For example, a user may enter account information for a checking account at Bank A. However, the cards used to access the checking account may not be associated with the checking account at all. Rather, the user might, for example, choose to have his Bank A credit card and his bank B credit card used for the card-swipe authentication sequence used to access his Bank A checking account. In some embodiments, the user may select the account to access or enter account information for the account to access at any of steps 601-604. In some cases, the user may select one or more accounts to be accessed using the card-swipe authentication sequence. For example, a user may select two accounts, then be given a choice between the two accounts during the authorization process (e.g., as disclosed above with regards to processes 300-500). According to disclosed embodiments, one or more of the cards used for the card-swipe authentication process may be inactive or invalid. For example, a user may choose to use her expired credit card as one of the cards used for the cards swipe authentication process.

In step 602, process 600 can also include receiving second card information. The second card information may be associated with a second card, which is different from the first card. Second card information can include a card number, expiration information, CVV code, number of an account associated with the card, PIN number, or other information associated with a second card. According to some embodiments, the second card and second card information may be associated with a financial account of the user. For example, the user may have a second bank account or a credit card account with a financial institution. As an additional example, the second card can be an expired card for the same checking account as the first card. According to disclosed embodiments, the first and second cards may be associated with different financial accounts or different financial institutions. For example, the first card may be associated with the user's checking account at Bank A and the second card may be associated with the user's credit account with Bank B. Of course, according to some embodiments, the cards may be associated with different financial accounts of the same financial institution. In some embodiments, the card-swipe authentication system can be configured to identify an account associated with the second card to be the account for which access (and authentication) is requested granted. Receiving second card information may be performed as described above with respect to receiving first card information at step 602. For example, second card information may be received through manual user entry or through a swipe of the second card.

The disclosed embodiments are not limited to receiving information or swipes of two cards. It is to be understood that more than two cards may be used in the card identification sequence. For example, a user may have three cards that she wishes to use in the sequence. In such a case, process 600 may include the additional step of receiving third card information. Accordingly, the card identification sequence would include at least one swipe of each of the three cards.

According to disclosed embodiments, card identification sequence may include timing information. Timing information can be the desired amount of elapsed time between swipes for successfully authentication. Adding timing information to the card identification sequence may result in increased security of the authentication sequence because in order for a user to be authenticated, the user would not only need to possess the required cards, but also know the order in which to swipe them and the amount of time to wait between swipes. For example, a user may identify a card identification sequence comprising four card swipes. The user may also identify that the elapsed time between the first and second swipe is to be five seconds, the time between the second and third swipe is to be ten seconds, and the time between the third and fourth swipes is to be five seconds. According to some embodiments, the user may manually enter these elapsed time values into user device 101 as part of the card identification sequence. In other embodiments, the elapsed time may be interpreted by detecting the amount of time elapsed between receiving card swipes. For example, terminal 102 may receive three card swipes, with an elapsed time of fifteen seconds between the first and second swipes, and seven seconds between the second and third swipes. Terminal 102 may be configured to detect and track the elapsed time between the swipes and recognize the amount of time as part of the card identification sequence. In some embodiments, the user may be given the option of whether she wants timing as part of the card identification sequence for authentication.

In some embodiments where user device 101 or terminal 102 detects the time between swipes, a buffer may be set around the timing value to account for natural variation in swipe timing and speed. Instead of, or in addition to, saving only the elapsed time value, the user device 101 may identify a range of acceptable elapsed time between swipes. For example, if user device 101 detects an elapsed time of four seconds between two swipes, it may apply a two second buffer to the timing. Thus, the acceptable elapsed time range between the two swipes for authentication purposes would be two to six seconds (two seconds more and two seconds less than the measured elapsed time).

According to disclosed embodiments, the card identification sequence may also include card type of swipe information. In some cases, a type of swipe may be specified (e.g., traditional magnetic stripe swipe, chip reader, NFC, Bluetooth, RFID, etc.). Swipe type information may include orientation information. As described above, some card readers may facilitate swipes of cards in multiple directions or orientations. Some card readers, for example some magnetic stripe readers, are capable of receiving a card swipe in multiple directions. For example, some readers that require the card be inserted in to the read and pulled back out can read the card regardless of whether the card is inserted face-up or face-down. Therefore, in some embodiments, a user may specify the type of the card for one or more of the card swipes in the card identification sequence. In some embodiments, the user may manually enter these type values into user device 101 as part of the card identification sequence. In other embodiments, terminal 102 may be configured to detect and track the type of swipes as part of receiving the card identification sequence.

In some embodiments, the user may provide an indication during enrollment to disregard swipe type when authenticating at terminal not configured to identify a specified type of swipe. For example, when a user's card identification sequence includes card swipes in a specified orientation, the user may specify that, when authenticating at a terminal not configured to identify card swipe orientation, the swipe pattern or timing may be sufficient to authenticate the user.

In some embodiments, the user may specify during enrollment an alternative card identification sequence for authenticating at terminals not configured to identify a type of card swipe. The alternative card identification sequence may not depend on the type of card swipe. For example, a user may specify that an alternative card identification sequence be used to authenticate at terminals not configured to identify card swipe orientation. The alternative card identification sequence may not specify card orientations.

In some embodiments, a user may expressly forbid authentication using terminals not configured to identify a type of card swipe during enrollment. In some instances, the user may effectively prevent authentication using such terminals by neither providing an indication to disregard swipe type nor specifying an alternative card identification sequence.

According to some embodiments, user device 101 or terminal 102 may require that the card identification sequence be entered more than once. For example, a user enrolling at an ATM terminal or with a mobile phone with a card reader may be required to enter the sequence three times. User device 101 or terminal 102 may be configured to record each of the three sequences and determine that each of the three sequences are the same. User device 101 or terminal 102 may also be configured to calculate a timing buffer based on the timing differences between the three sequences. For example, time between the first and second swipes in each of the three entered sequences may have varied from five seconds to eight seconds. Accordingly, the user device 101 may set the acceptable range of times between the first and second swipes as five to eight seconds. As an additional example, statistics of the swipe timing can be determined, such as mean and standard deviations in inter-swipe times. The statistics can be determined for each pair of swipes in the sequence (e.g., a first standard deviation for the time difference between the first and second swipes, and a second standard deviation for the time difference between the second and third swipes) or over all inter-swipe times in the sequence. The user device 101 may set the acceptable range of times between two swipes based on the statistics of the swipe timings (e.g., the mean plus or minus the standard deviation in swipe times). In some embodiments, the user device 101 may determine a buffer to build into the range. To continue the prior example, the computing device may determine that an additional one second buffer should be added to the detected time range. Thus, when the acceptable range of times between the first and second swipes is five to eight seconds, the acceptable time range including the buffer would be four to nine seconds.

At step 603, process 600 may include determining whether the received card identification sequence satisfies a security standard. For example, a financial service provider corresponding to financial service system 104 may have predefined security standards that the card identification sequence must meet in order to be considered secure enough to prevent fraud. The security standard may define one or more requirements of the card swipe. The security standard may define a required number of cards, number of swipes, timing requirements, card orientation requirements, swipe type requirements, etc. For example, security standard may require that a minimum of three different cards and four separate swipes be used in the card identification sequence. Another exemplary security standard may require that at least two cards and three separate swipes be used in the card identification sequence, in addition to at least one timing requirement between swipes.

In some embodiments, the security standard may be stored on authentication server 103 or financial service system 104. In some embodiments, authentication server 103 or financial service system 104 may transmit the security standard to user device 101. In such embodiments, user device 101 may determine whether the standard is met by comparing the received card identification sequence to the security standard. In various embodiments, user device 101 may transmit the received card identification sequence to authentication server 103 or financial service system 104. In such cases, authentication server 103 or financial service system 104 may determine whether the standard is met by comparing the received card identification sequence to the security standard. After making a determination, authentication server 103 or financial service system 104 may send an indication of whether the card identification sequence meets the standard to user device 101.

In some embodiments, step 603 may include generating a complexity score. In such cases, the security standard may be a threshold for the complexity score. For example, if the complexity score exceeds the threshold, the security standard may be met. Conversely, if the complexity score does not meet the threshold, the security standard may not be met. The complexity score may represent a quantitative value of the complexity or uniqueness of the received card identification sequence. The complexity score may quantify the complexity of a card identification sequence by taking into account the number of different cards, the number of required swipes, the presence and complexity of timing requirements, the presence and complexity of swipe type requirements, whether one or more of the cards corresponds to the account or accounts being accessed, whether any of the cards is inactive, etc. For example, a card identification sequence entered by a user that includes four different cards, six swipes, and specific timing requirements between swipes may receive a very high complexity score. As another example, a card identification sequence including only one card swiped twice may receive a low complexity score.

If the security standard is met by the received card identification sequence, process 600 may proceed to step 604. In some cases, if the security standard is not met, process 600 may go back to step 602 and receive a new or edited card identification sequence. For example, upon the determination that the card identification sequence does not meet the security standard, computing device 101 may prompt the user to enter a new or more complex card identification sequence.

At step 604, process 600 may include storing the user identification information, first card information, second card information, and card identification sequence (collectively "enrollment information"). The storing may occur locally, for example on user device 101. In some embodiments, user device 101 may transmit the enrollment information to authentication server 103 or financial service system 104 for storage. In some embodiments, user device 101 may transmit the enrollment information to a database connected to network 105 or a cloud-implemented storage system.

In some embodiments, some or all of the enrollment information may be transmitted to authentication server 103 or financial service system 104 in an encrypted or hashed form. This may provide additional security to the system and additional protection for the user's sensitive data, such as card numbers. For example, instead of transmitting the user's actual card numbers to the financial service system 104 for storage, computing device may hash the card numbers and send the hashes to financial service system 104. In this way, the user's actual card numbers never actually need to be transmitted or stored on the financial service system. In some cases this may be desirable for a user who wishes to use a card associated with a given financial service provider (e.g., Bank A) in a card identification sequence associated with a different financial service provider (e.g., Bank B). In that case, Bank B may not be exposed to (or store) the user's Bank A card information.

In some embodiments, the hash function implemented during the enrollment process 600 may be implemented during processes 300-500 above. For example, when a terminal 102 executes process 300 described above to authenticate a user using a card-swipe sequence, terminal 102 may send hashes of the card information to financial service system 104 for confirmation of the card-swipe sequence. Terminal 102 may be configured to use the same hash function that is used by user device 101 during enrollment process 600. In this way, the financial service system 104 may compare the enrollment information with the received card information and card-swipe sequence from terminal 102 to determine if the card-swipe sequence is correct and the user should be authenticated. In such a case, the financial service system 104 may only be exposed to the hashed card number values and not the actual card numbers. Such transmitting and storage of hashed values may increase security of the system by, for example, protecting the confidentiality of the user's card information even in the event of a security breach of financial service system 104 or authentication server 103.

At step 605, process 600 may include authenticating a user based on the card identification sequence. In some embodiments, authentication based on the card identification sequence may be completed through one of processes 300, 400, and/or 500 described above. For example, a user may go to a bank ATM terminal, enter the swipes identified through the card identification sequence, and be authenticated through the sequence as described above.

In some embodiments, the authentication may occur on the same device that executes steps 601-604. For example, after entering the information in steps 601-604, a user may wish to ensure that the card identification sequence was properly received. Accordingly, user device 101 may receive a sequence of card swipes via a card reader and authenticate the user as described above with respect to processes 300, 400, and/or 500.

In some embodiments, the authentication may occur using a second device, separate from the device that executes the other steps of process 600. For example, a user may use user device 101 (e.g., a smartphone) to complete the enrollment process. Accordingly, user device 101 may execute steps 601 through 604 of process 600 and a second device, e.g., terminal 102, may execute step 605. In some embodiments, the first device (e.g., user device 101) may be remote from the second device (e.g., terminal 102).

In some embodiments, process 600 may be used to update a user's existing card identification sequence, or create a new card identification sequence for a user. For example, a user may lose one or more of the cards associated with the card identification sequence. The user may wish to replace this card in a card identification sequence or create a new sequence using a computing device. User device 101 may execute process 600 to receive a new or updated card identification sequence from the user.

Another aspect of the disclosure is directed to a non-transitory computer-readable medium storing instructions that, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

As used herein, the indefinite articles "a" and "an" mean "one or more" unless it is unambiguous in the given context. Similarly, the use of a plural term does not necessarily denote a plurality unless it is unambiguous in the given context. As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

What is claimed is:

1. A computing device for authenticating a user, the computing device comprising:
at least one processor; and
at least one computer-readable media containing instructions that, when executed by the at least one processor, cause the computing device to perform operations comprising:
receiving a sequence of card swipes, the receiving comprising:
detecting a swipe of a first card,
storing first card information associated with the first card;
detecting a swipe of a second card,
storing second card information associated with the second card; and
authenticating a user based on the sequence of card swipes;
wherein receiving a sequence of card swipes comprises receiving a combination of three or more swipes of at least one of the first card or the second card.

2. The computing device of claim 1, wherein authenticating the user comprises transmitting the first and second card information to an authentication server.

3. The computing device of claim 1, wherein authenticating the user comprises transmitting the first card information and a hash of the second card information to an authentication server.

4. The computing device of claim 1, wherein the operations further comprise receiving a user input indicating completion of the sequence of card swipes.

5. The computing device of claim 1, wherein the second card is inactive.

6. The computing device of claim 1, wherein the first card is associated with a first financial account and the operations further comprise granting the user access to the first financial account.

7. The computing device of claim 1, wherein:
the first and second cards are not associated with a first financial account; and
the operations further comprise granting the user access to the first financial account.

8. The computing device of claim 1, wherein receiving a sequence of card swipes further comprises detecting one or more swipes of one or more additional cards.

9. The computing device of claim 1, wherein:
the operations further comprise:
tracking an amount of elapsed time between a swipe of the first card and a swipe of the second card, and
determining that the amount of elapsed time falls within a predetermined time range; and
authenticating the user is further based on the determination that the amount of elapsed time falls within the predetermined time range.

10. A computing device for authenticating a user, the computing device comprising:
at least one processor; and
at least one computer-readable media containing instructions that, when executed by the at least one processor, cause the computing device to perform operations comprising:
receiving a sequence of card swipes, the receiving the sequence of card swipes comprising:
detecting a swipe of a first card,
storing first card information associated with the first card;
detecting a swipe of a second card,
storing second card information associated with the second card,
tracking an amount of elapsed time between the first and second card swipes, and
determining that the amount of elapsed time falls within a predetermined time range; and
authenticating a user based on the sequence of card swipes and the determination that the amount of elapsed time falls within the predetermined time range.

11. The computing device of claim 10, wherein the operations further comprise providing a visual indication of the elapsed time to the user.

12. The computing device of claim 11, wherein the visual indication of the elapsed time indication includes a timer displayed on a screen of the computing device.

13. The computing device of claim 11, wherein the visual indication of the elapsed time includes a repeating flash of light.

14. The computing device of claim 10, wherein the operations further comprise receiving a user input indicating completion of the sequence of card swipes.

15. The computing device of claim 10, wherein authenticating the user comprises transmitting the first and second card information to an authentication server.

16. The computing device of claim 10, wherein authenticating the user comprises transmitting the first card information and a hash of the second card information to an authentication server.

17. The computing device of claim 10, wherein the first card is associated with a financial account and the operations further comprise granting the user access to the financial account.

18. The computing device of claim 10, wherein:

the first and the second cards are not associated with a first financial account; and the operations further comprise granting the user access to the first financial account.

19. A computer-implemented method for enrolling a user in an authentication system, the method comprising:

receiving, using a first device, user identification information, the user identification information comprising a user identifier or an account identifier associated with a user account;

receiving, using the first device, first card information, the first card information being associated with a first card and comprising a card number and a card expiration;

receiving, using the first device, second card information, the second card information being associated with a second card and comprising a card number and a card expiration;

receiving, using the first device, a card identification sequence, the receiving comprising identifying an order in which one or more swipes of the first card and one or more swipes of the second card must occur for a user to be authenticated;

determining that the card identification sequence meets a security standard;

storing, based on the determination, the user identification information, first card information, second card information, and card identification sequence; and authenticating, using a second device and based on the card identification sequence, a user.

20. The method of claim 19, wherein the first device is remote from the second device.

* * * * *